US011711563B2

(12) United States Patent
Anderegg et al.

(10) Patent No.: US 11,711,563 B2
(45) Date of Patent: *Jul. 25, 2023

(54) METHODS AND SYSTEMS FOR GRAPHICS RENDERING ASSISTANCE BY A MULTI-ACCESS SERVER

(71) Applicant: Verizon Patent and Licensing Inc., Basking Ridge, NJ (US)

(72) Inventors: Bradley G. Anderegg, Glen Gardner, NJ (US); Matthew Walter Mitman, Bowman, SC (US); James Susinno, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,931

(22) Filed: Jun. 13, 2022

(65) Prior Publication Data

US 2022/0312063 A1 Sep. 29, 2022

Related U.S. Application Data

(63) Continuation of application No. 16/805,397, filed on Feb. 28, 2020, now Pat. No. 11,395,027.

(51) Int. Cl.
*H04N 7/173* (2011.01)
*H04N 21/266* (2011.01)
*G06F 9/38* (2018.01)
*G06T 15/00* (2011.01)
*H04N 21/258* (2011.01)

(52) U.S. Cl.
CPC ......... *H04N 21/266* (2013.01); *G06F 9/3877* (2013.01); *G06T 15/005* (2013.01); *H04N 21/25816* (2013.01)

(58) Field of Classification Search
CPC ............ H04N 21/266; H04N 21/25816; G06F 9/3877; G06T 15/005
See application file for complete search history.

(56) References Cited

U.S. PATENT DOCUMENTS

| | | | |
|---|---|---|---|
| 2011/0119722 A1* | 5/2011 | Kellerman | H04N 21/4622 725/110 |
| 2011/0161400 A1* | 6/2011 | Silyaev | H04N 21/4622 709/203 |
| 2012/0110067 A1* | 5/2012 | Birsa | G06F 16/9577 709/203 |
| 2015/0310642 A1* | 10/2015 | Kruglick | H04N 5/44 345/441 |
| 2017/0031885 A1* | 2/2017 | S G | G06T 11/60 |

* cited by examiner

*Primary Examiner* — Mulugeta Mengesha

(57) ABSTRACT

An illustrative multi-access server receives a request from a client system, the request indicating a requested rendering operation. The multi-access server also accesses input data from an asset data source. The multi-access server performs a rendering pass on the input data, the rendering pass performed in accordance with the requested rendering operation to generate a render pass output dataset. The render pass output dataset is representative of a renderable image depicting image content in a first form having limited quality or detail. The render pass output dataset is also configured for use in generating fully-rendered image data that depicts the image content in a second form having additional quality or detail beyond the limited quality or detail of the first form. Corresponding methods and systems are also disclosed.

20 Claims, 14 Drawing Sheets

```
"assets": [
{
    "id": 101,
    "source": "filesystem",
    "filename": "images/image.png"
}
],
"renderPasses": [
{
    "id": 1,
    "name": "imagesource",
    "type": "PPUnitImage",
    "assetID": 101
}
]
```
410-1

Fig. 5

```
"assets": [
{
    "id": 101,
    "source": "filesystem",
    "filename": "images/image1.png"
},
{
    "id": 102,
    "source": "filesystem",
    "filename": "images/image2.png"
}],
"renderPasses": [
{
    "id": 1,
    "name": "imagesource1",
    "type": "PPUnitImage",
    "assetID": 101
},{
    "id": 2,
    "name": "imagesource2",
    "type": "PPUnitImage",
    "assetID": 102
},{
    "id": 3,
    "parent": 1,
    "name": "blurx",
    "type": "PPUnitInOut",
    "scaleFactor": 2.0,
    "shaderComponent": "GB.1"
},{
    "id": 4,
    "parent": 2,
    "name": "tonemap",
    "type": "PPUnitInOut",
    "scaleFactor": 1.0,
    "shaderComponent": "TM.0"
},{
    "id": 5,
    "parents": [3,4],
    "name": "mix",
    "type": "PPUnitInOut",
    "scaleFactor": 1.0,
    "shaderComponent": "CP.0",
    "source1Multiplier": 1.0,
    "source2Multiplier": 1.0
}]
```

METHODS AND SYSTEMS FOR GRAPHICS RENDERING ASSISTANCE BY A MULTI-ACCESS SERVER

RELATED APPLICATIONS

This application is a continuation application of U.S. patent application Ser. No. 16/805,397, filed Feb. 28, 2020, and entitled "Methods and Systems for Request-Based Graphics Rendering at a Multi-Access Server," which is hereby incorporated by reference in its entirety.

BACKGROUND INFORMATION

In a variety of entertainment, educational, and other types of applications, two-dimensional ("2D") and three-dimensional ("3D") graphics are rendered to present various types of graphical content to users. For example, graphics representative of a 3D scene may be presented for video gaming applications, extended reality applications (e.g., virtual reality applications, augmented reality applications, etc.), 3D animation or simulation applications, immersive communication applications, and/or any of various other types of applications in which such content is presented to users.

In many of these types of applications, a particular scene may be presented to a user by a media player device used by the user. Typically, such media player devices are consumer devices such as mobile devices (e.g., smartphones, tablet devices, headsets, etc.), television devices, personal computer devices, or the like. In general, it is not practical or efficient, and it may not even be feasible, for such media player devices to host sufficient computing power to perform highly intensive graphics processing in the real-time or near-real-time manner called for by various applications.

Accordingly, while responsiveness and continuity considerations may be best served by local graphics rendering at the media player devices themselves, realism and immersiveness considerations are generally compromised when graphics rendering is performed solely by the media player devices. This may be the case especially for processing-intensive rendering techniques, which may be completely outside the range of possibility for the computing resources of many media player devices in use today.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-6 illustrate exemplary rendering requests configured to be the basis of graphics rendering performed by the rendering assistance system of FIG. 1 according to embodiments described herein.

DETAILED DESCRIPTION OF PREFERRED EMBODIMENTS

Figure 1:
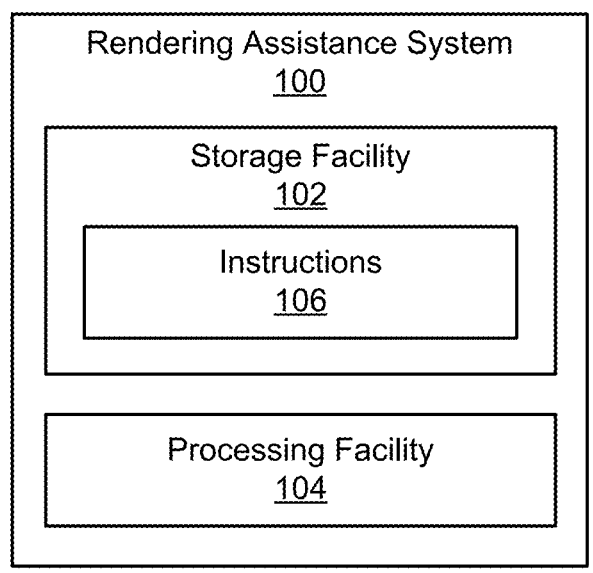
FIG. 1 illustrates an exemplary rendering assistance system for request-based graphics rendering at a server according to embodiments described herein.

Methods and systems for request-based graphics rendering at a multi-access server are described herein. For example, such request-based graphics rendering may be performed at a multi-access server such as a multi-access edge compute ("MEC") server implemented at a suitable node of a provider network (e.g., a core node, a middle node, an extreme edge node, etc.), or another suitable multi-access server (e.g., a cloud server that is implemented external to a provider network, etc.).

Significant data processing is generally required to fully and accurately render graphics for a lifelike and immersive rendering of a virtual world (e.g., a 2D or 3D world) used in various applications (e.g., video games, extended reality, animation, movie special effects, etc.). For example, there may exist extreme complexity in the dynamic illumination of complex objects and textures by light originating from various dynamic light sources in a virtual world. Media player devices used to present the rendered graphics to end users may not incorporate sufficient resources to handle such complexity in real time without a noticeable compromise in quality. For instance, media player devices tasked with real-time graphics rendering of a complex 3D scene may employ processing techniques that do not realize the same levels of realism and immersiveness as can be achieved using more advanced (i.e., processing-intensive) techniques.

To address these deficiencies of media player devices, certain conventional approaches may rely on powerful computing systems (e.g., servers separate from the media player devices presenting the final rendered graphics) to render graphics in accordance with more advanced techniques. Such systems, for example, may fully render graphics that can be provided to media player devices in a video format that is straightforward for the media player devices to decode and present without any rendering being required on the device side. This type of approach, however, relies heavily on stable and low latency communications between the device and the server. For example, if there should be any anomaly, outage, or temporary glitch of any kind to the communication interface (which may be common and unavoidable for many communications technologies), the presentation of the graphics may glitch, stutter, buffer, or otherwise reveal the communication issue in a manner that is distracting and undesirable to the end user.

To address these potential deficiencies, methods and systems described herein for request-based graphics rendering provide a flexible architecture and framework for graphics rendering that can be performed at least partially on a MEC server (or other suitable multi-access server) that is separate from, but communicatively coupled with very low latency to, a media player device presenting the final rendered graphics. In certain examples where it would be desirable, the disclosed architecture would allow for a graphics rendering pipeline to be set up entirely using resources of one or more MEC servers so that the media player device is not required to perform any part of the graphics rendering. In other examples, however, this framework allows for certain aspects of graphics rendering (e.g., view-dependent reprojection, time warp or space warp operations or other operations for preventing simulation sickness, etc.) to be performed by the media player device or another client device (e.g., a state server such as a dedicated game server, etc.), while other aspects of the graphics rendering are performed by the ample resources of the MEC server. For instance, in certain implementations, it may be advantageous for the media player device to perform relatively basic or non-processing-intensive aspects of the graphics rendering, while more advanced or processing-intensive aspects of the graphics rendering are performed by the MEC server. In this way, the benefit of performing processing with powerful server resources (rather than local device hardware) may be combined in a flexible and customizable way with the benefit of having at least basic rendering performed locally to mitigate potential communications issues.

To this end, and as will be described in more detail below, an exemplary rendering assistance system implemented by a MEC server may be configured to perform various operations to implement the request-based graphics rendering at the MEC server described herein. For example, the rendering assistance system may receive a request from a client system that is separate from the MEC server. The client system may be implemented, for instance, by a media player device that will ultimately present the rendered image to the user, or by a separate system (e.g., a state server such as a dedicated game server configured to facilitate and enable a multiplayer video game, etc.) that is associated with such a media player device.

Upon receiving the request, the rendering assistance system may parse the request to identify one or more pieces of information that the client system has included within the request. For example, the parsing may allow the rendering assistance system to identify a requested rendering operation selected from a plurality of rendering operations that are supported by the rendering assistance system (i.e., that the rendering assistance system is configured to perform based upon such requests). As another example, the parsing may allow the rendering assistance system to identify an asset pointer usable by the rendering assistance system to access input data from an asset data source (e.g., a data source internal or external to the MEC server itself).

In response to the request and based on the asset pointer, the rendering assistance system may access the input data from the asset data source. The input data may include raw graphics data, state data, metadata, partially rendered graphics data, and/or any other input data as may serve as the basis for the requested rendering operation to be performed or as may serve to facilitate the performance of the requested rendering operation in any suitable way. Having accessed the input data, the rendering assistance system may proceed to perform a rendering pass on the input data in accordance with the requested rendering operation. In this way, the rendering assistance system may partially render an image that, when fully rendered (e.g., after additional rendering passes have been performed in some examples), is to be presented to a user by way of the media player device.

The rendering assistance systems and methods described herein for performing these types of request-based graphics rendering at a MEC server may provide various benefits and advantages. For example, relatively straightforward requests may serve as powerful tools in this framework to customize how a particular frame or frame sequence is to be rendered, or to initialize an entire rendering pipeline through which many frames or frame sequences may be processed. In some examples, a plurality of rendering passes may thus be set up (in a single request or multiple requests) to be performed in any suitable way by the computing resources of one or more computing systems including a media player device, a state server or other dedicated server, a MEC server residing on a provider network, a cloud server residing external to the provider network (e.g., on the Internet), or another computing system as may serve a particular implementation. Such a plurality of rendering passes may be configured to take place sequentially or in parallel in any manner indicated in the request, thereby providing great flexibility and customizability for different situations that may be encountered by the rendering assistance architecture.

In addition to the flexibility provided by systems and methods described herein, another advantage is that advanced, but less crucial, rendering techniques may be performed by systems having relatively powerful resources (e.g., the MEC server), while basic and more crucial rendering techniques may be performed by local resources (e.g., resources of the media player device) that are not subject to interference by communication latencies and potential interruptions or glitches. For example, a request may be provided that directs a media player device to locally perform rendering operations that construct the main elements of an image, while directing the rendering assistance system (e.g., the MEC server) to perform advanced rendering operations associated with relatively subtle but immersive and lifelike details (e.g., the interplay of light with complex textures and objects such as fog or human hair, etc.). In this way, high quality images that fully utilize various advanced techniques to render graphics in highly realistic ways can be presented on media player devices without latency or other issues while a communication link is functioning properly, and only the relatively subtle and advanced details (and not the entire rendering of entire frames) are interrupted when the communication link between the media player device and the server experiences issues or temporarily fails. At the same time, the processing load required by the media player device may be kept relatively low, thereby increasing battery life, reducing heat, improving performance of applications executing on the media player device, and so forth.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary rendering assistance system 100 ("system 100") for request-based graphics rendering at a MEC server (or another suitable multi-access server, as described above). For example, as will be described in more detail below, system 100 may be implemented on (i.e., implemented by the resources of) a MEC server that is communicatively coupled with a client device (e.g., a media player device, etc.) and may be configured to enable or facilitate the request-based graphics rendering in adaptable and customizable ways as described herein.

As shown, system 100 may include, without limitation, a storage facility 102 and a processing facility 104 selectively and communicatively coupled to one another. Facilities 102 and 104 may each include or be implemented by hardware and/or software components of the MEC server (e.g., processors, memories, communication interfaces, instructions stored in memory for execution by the processors, etc.). In some examples, facilities 102 and 104 may be distributed between multiple devices (e.g., multiple computers at a single MEC server node, etc.) and/or multiple locations as may serve a particular implementation.

The methods described herein for request-based graphics rendering at a MEC server may be performed, implemented, or used by implementations of system 100 configured for use in a variety of different types of use cases. To provide just a few non-limiting examples, implementations of system 100 may be deployed on a 5G, real-time enterprise ("RTE") network (or any other suitable provider network in which MEC technology is deployed) to enable extended reality applications (e.g., augmented or virtual reality applications, etc.), gaming applications (e.g., 3D games in which users perform tasks alone or by interacting with other users playing the game simultaneously), or any other applications in which it is desirable to render high-quality and/or low-latency graphics. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with request-based graphics rendering at the MEC server in any of the ways described herein. For example, processing facility 104 may be configured to receive a request from a client system that is separate from the MEC server, such as a media player device or a state server configured to provide requests on behalf of one or more media player devices (e.g., a dedicated game server in a multiplayer video game configuration, etc.).

The request may include various information configured to direct system 100 to perform or facilitate graphics rendering operations in a variety of ways. As such, processing facility 104 may parse the request to identify certain pieces of information associated with how the graphics rendering is to be performed. For instance, one piece of information identified by the parsing may be a requested rendering operation selected from a plurality of rendering operations supported by the rendering assistance system. As will be described in more detail below, a menu of different types of rendering operations that system 100 supports (i.e., is capable of performing and configured to perform) may be made available to the client system and/or to any person involved in generating the request. To give a few non-limiting examples, for instance, supported rendering operations may include physically-based rendering operations, hair shader rendering operations and other shading operations, raytracing operations, and so forth. Various additional types of rendering operations will be described in more detail below.

Another piece of information that processing facility 104 may identify as the request is parsed is an asset pointer usable by the rendering assistance system to access input data from an asset data source. The asset pointer identified from the request may be implemented as an asset identifier of any kind and may be usable to access, or serve to facilitate the accessing of, asset data from an asset data source in any suitable way. For example, the asset pointer may be a file path, link, or other pointer to a location on the MEC server (e.g., within storage facility 102 or another data store of the MEC server) where the input data is stored. In other examples, the asset pointer may be a uniform resource locator ("URL") or other pointer or link to a location external to the MEC server where the input data is stored. In still other examples, the input data may be embedded directly into the request itself, such that the asset pointer is implemented as metadata that indicates as much (e.g., a data header for the embedded input data, etc.) and the asset data source would be the client device or the request itself. Various other information (e.g., other requested rendering operations, parameters further defining rendering operations or other aspects of the rendering, etc.) may also be included in and parsed from the request, as will be described in more detail below.

Based on the asset pointer, processing facility 104 may access (e.g., load, download, receive, etc.) the input data from the asset data source. Processing facility 104 may then perform a rendering pass on the accessed input data. For instance, the rendering pass may be performed in accordance with the requested rendering operation (as well as any parameters or other instructions as may be included in and parsed from the request) to partially render an image. This partially rendered image may not be the same as the fully rendered image that is to ultimately be presented to a user by way of a media player device. For example, the partially rendered image may depict a human subject with hair, but may not yet have implemented detailed shading processes to increase the realism of the light interplay with the hair (since, for example, such details may be handled by a different rendering operation during a subsequent rendering pass that may also be indicated by the request).

As mentioned above, an advantage of the rendering framework enabled by a rendering assistance system such as system 100 is that the framework is highly adaptable to serve various different situations and use cases. For example, certain uses cases such as live gaming or extended reality use cases may call for real-time processing of large and complex worlds, while other uses cases may afford longer processing times or may involve less complex processing. In any of these situations, a proper request can be configured to push as much or as little of the rendering work from the client device to the MEC server in any manner (e.g., sequential, parallel, on-demand, time delayed, etc.) as may serve the particular application. As such, in one example, a rendering request may be generated that directs a media player device to perform most of the rendering work (e.g., many of the different rendering passes) while reserving a few of the more advanced and processing-intensive rendering operations to be performed by the rendering assistance system implemented on the MEC server. Conversely, in another example, a rendering request may be generated that directs the rendering assistance system to perform various rendering operations in a variety of parallel rendering passes, while the media player device is directed to receive and combine the work of all the rendering passes into a final, fully-rendered image. In still another example, a rendering request may configure a pipeline in which the rendering assistance system performs all the rendering passes, including combining the output data from various rendering passes into a final, fully-rendered image, and the media player device is provided with the fully-rendered image ready to be presented to the user. These types of examples and various others (e.g., examples involving state servers generating the rendering requests, etc.) will be described in more detail below.

In various applications and use cases, as has been mentioned, system 100 may be configured to operate in real time so as to provide, receive, process, and/or use the data described above (e.g., requests, input and output graphics data, etc.) immediately as the data is generated, updated, changed, exchanged, or otherwise becomes available. As a result, system 100 may perform request-based graphics rendering at a MEC server based on relevant, real-time data so as to allow the graphics rendering to happen responsively to user decisions that would affect the user's viewpoint of the 3D scene, that would affect objects within the scene, and so forth. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may perform request-based graphics rendering based on data that is relevant and up-to-date.

Figure 2:
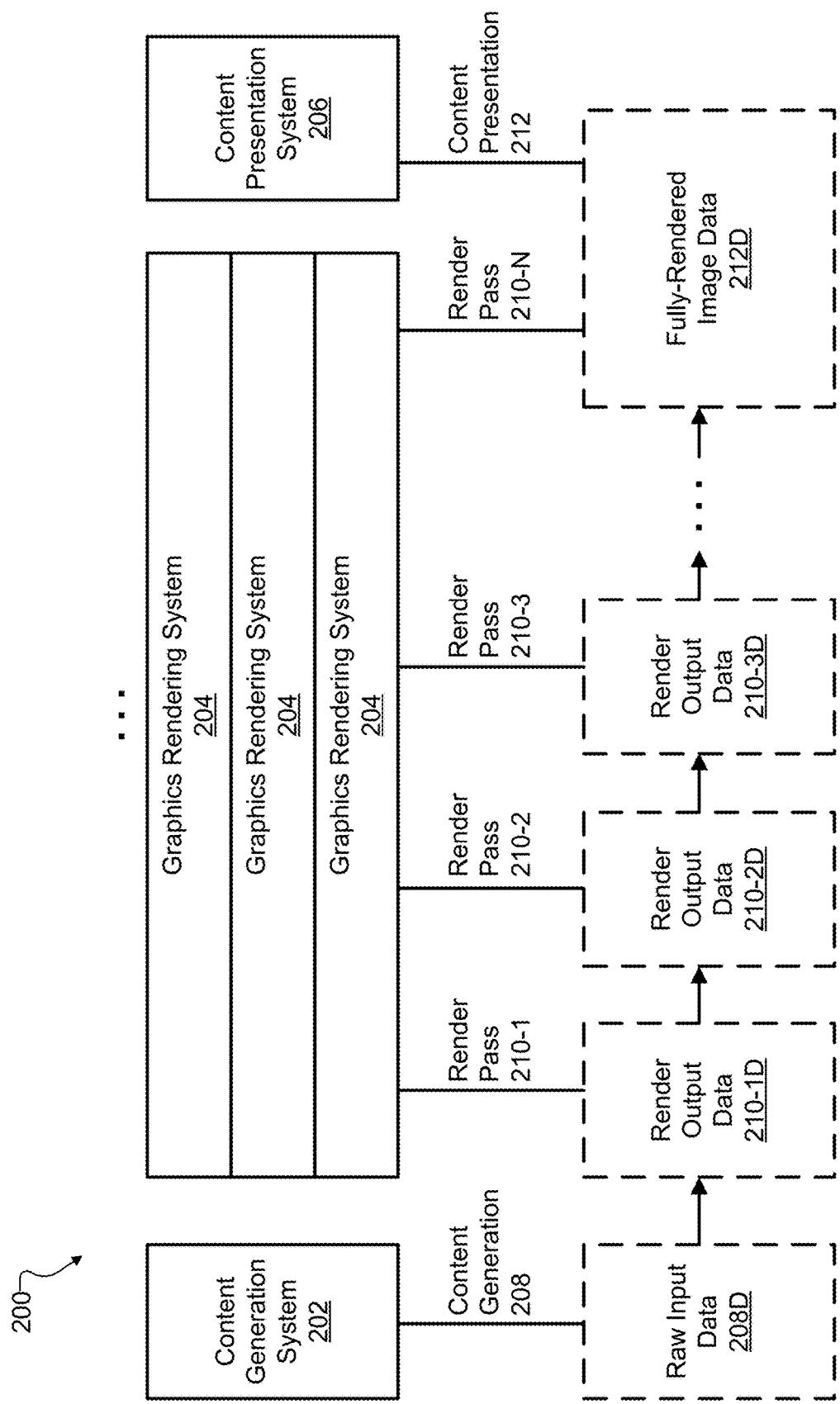
FIG. 2 illustrates an exemplary dataflow of graphical content through a rendering pipeline to be presented according to embodiments described herein.

To illustrate the rendering process with which system 100 is configured to assist, FIG. 2 shows an exemplary dataflow 200 of graphical content through a rendering pipeline from content generation to content presentation. Specifically, as shown, dataflow 200 includes a content generation system 202, several graphics rendering systems 204, and a content presentation system 206. Each of these systems is depicted using solid lines and will be understood to represent one or more computing systems for processing content or systems otherwise associated with content (e.g., a camera and/or microphone for capturing content, a screen and/or speakers for presenting the content after it has been processed, etc.). As will be described, while separate systems are depicted in FIG. 2, it will be understood that these system may be combined or divided in any suitable manner, such that more or fewer systems may be employed in a given implementation than are shown in FIG. 2.

Additionally, below the physical systems 202-206, various operations 208-212 are indicated to be performed by systems 202-206, and various corresponding data instances 208D-212D are shown to result from these operations. As illustrated, dashed lines and arrows are used to represent the data as it progresses through the rendering pipeline from raw input data to fully-rendered image data (i.e., data representative of an image ready for presentation to the user). Each operation 208-212 will now be described in more detail, along with the systems 202-206 that perform the operations and the corresponding data 208D-212D that results from the operations.

Content generation system 202 may be implemented by any combination of computing and/or other technology that is configured to generate raw input data 208D. For instance, in certain implementations, content generation system 202 may include one or more image or video capture devices (e.g., a camera, a video camera, a depth detection device, etc.) and processing resources to convert the captured data to raw input data in a suitable form for the render pipeline of dataflow 200. As one example, content generation system 202 could capture raw images of a scene from different vantage points and stitch the images together to form a panoramic image that is configured to serve as raw input data 208D in the render pipeline.

While image capture of a real-world scene may be involved in certain implementations, other implementations may not involve real-world capture, but, rather, may involve generating raw input data 208D that includes object models and textures, state data (e.g., data indicative of respective locations and orientations (poses) of characters, objects, light sources, etc., that are to be rendered), background imagery, and so forth. Based on these types of data, a final image may be rendered that is not necessarily based on any captured real-world imagery, and that represents a virtualized world. In other implementations, content generation system may generate content based on a combination of captured and virtualized data in any manner as may serve a particular implementation. Raw input data 208D may thus take any suitable form or be represented in any suitable data format.

Graphics rendering systems 204 are configured to perform a plurality of render passes 210 (e.g., render passes 210-1 through 210-N) to generate a series of render output data 210-D (e.g., render output data 210-1D, 210-2D, 210-3D, etc.) and, finally, to achieve fully-rendered image data 212D. Each different instance of render output data 210-D resulting from each different render pass 210 may represent a different example of what is referred to herein as a "partially-rendered image." Similarly, fully-rendered image data 212D, which results from all of the requested render passes being completed, represents what is referred to herein as a "fully-rendered image."

As used herein, a fully-rendered image is generated based on output data from a plurality of render passes so as to be ready for presentation to a user on a display device. In contrast, as used herein, a partially-rendered image will be understood to refer to any set of render pass output data that contributes to the generation of the fully-rendered image. More particularly, a partially-rendered image may refer to a set of output data, in any suitable form, that is a product of one or more render passes (e.g., an independently-performed render pass, a set of cumulative render passes that build on one another, etc.), and that is configured for use, directly or indirectly, as input data for generating the fully-rendered image. In certain examples, such render pass output datasets may represent of a renderable image that, while not including the same amount of quality or detail as the fully-rendered image will include, would nonetheless be recognizable as the image if presented to the user. In other examples, the render pass output dataset may take a from (e.g., data representative of a look-up table, a list of values, etc.) that is not renderable or would not be recognizable to the user as the image if presented. In this type of example, the partially-rendered image may be an "image" only in the technical sense that the data incorporated in the dataset (e.g., the data incorporated into the look-up table or list, etc.) is configured for use in forming the fully-rendered image.

Figure 3:
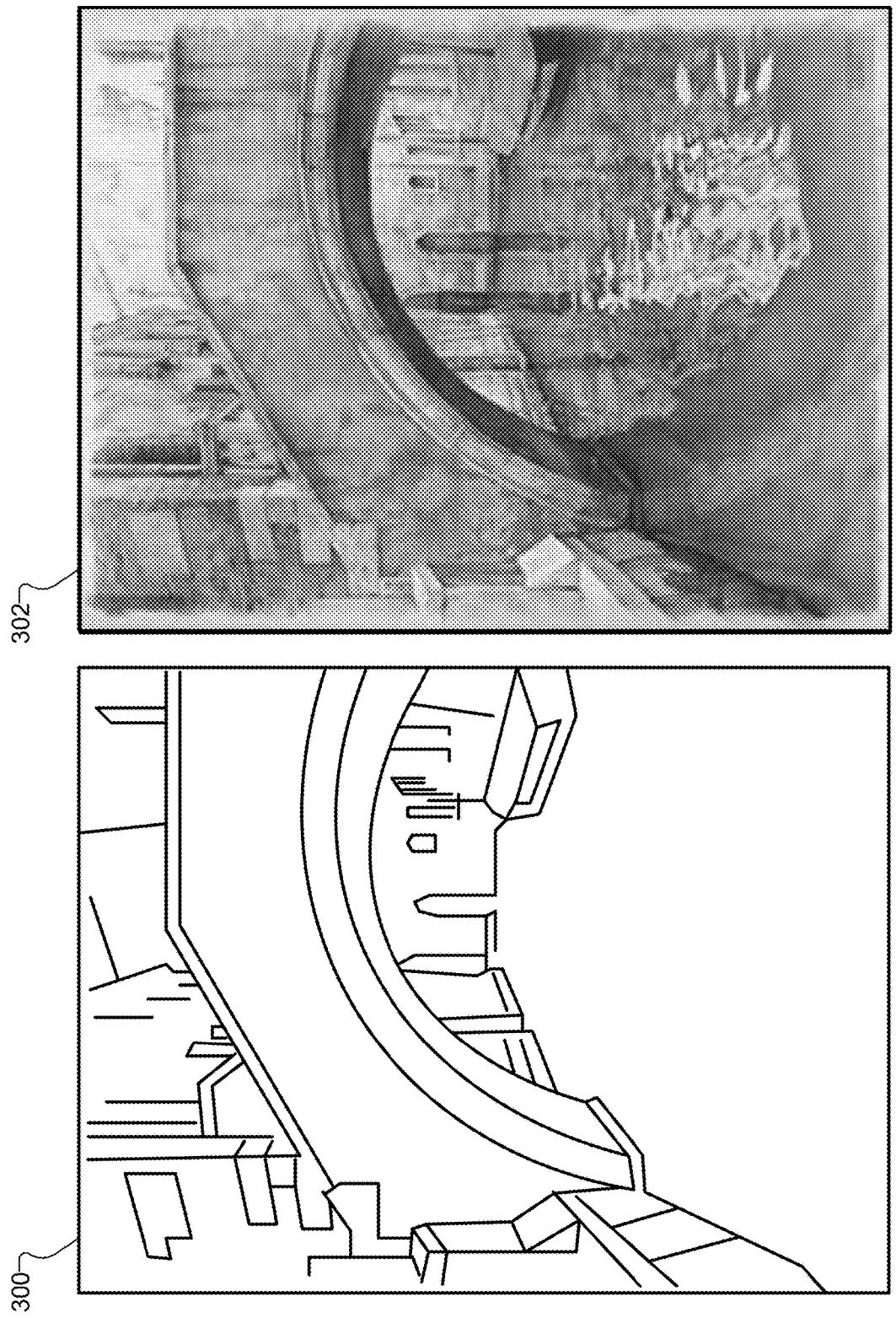
FIG. 3 illustrates an exemplary depiction of an image as partially rendered by a rendering pass and an exemplary depiction of the image as fully rendered by a set of rendering passes according to embodiments described herein.

To illustrate, FIG. 3 depicts a partially-rendered image 300, which represents an example of one type of partially-rendered image output by a particular rendering pass. Specifically, as shown, partially-rendered image 300 is formed by at least one rendering pass to form a recognizable image that lacks detail but could be presented to a user if necessary. As mentioned above, it will be understood that other types of partially-rendered images may include data that does not represent a recognizable image like image 300, but that is configured in some other way to contribute to a fully-rendered image.

Also in FIG. 3 (alongside partially-rendered image 300), an exemplary fully-rendered image 302 is depicted that implements the same image as partially-rendered image 300. In some cases, fully-rendered image 302 may be cumulatively generated as one rendering pass after another cumulatively add rich detail and various characteristics (e.g., lighting, shading, colors, textures, etc.) to the image. In other cases, the process of generating fully-rendered image 302 from partially-rendered image 300 and other partially-rendered images may not involve this type of cumulative process or at least may not be limited to this type of accumulation of detail on an image that is passed along. Rather, in these examples, partially-rendered images that have been created by independent render passes may be combined in other ways to form fully-rendered image 302.

Returning to FIG. 2, each graphics rendering system 204 may represent a computing system that is configured to perform at least one of the rendering operations described herein on either raw input data 208D or on render output data 210D from a previous render pass 210 that has already been performed. For example, one graphics rendering system 204 may be implemented by a rendering assistance system implemented by a MEC server, another graphics rendering system 204 may be implemented by a media player device used by a user, another graphics rendering system 204 may be implemented by a state server or other dedicated or auxiliary server (e.g., including other MEC servers or cloud servers, etc.) that is associated with a particular use case and used in a particular implementation. While three graphics rendering systems 204 are explicitly shown in FIG. 2, it will be understood that the rendering operations may be divided flexibly between more or fewer (e.g., as few as one) graphics rendering systems 204 in different implementations, depending on what is directed by a given request.

Accordingly, graphics rendering systems 204 are illustrated in FIG. 2 in a manner that intentionally leaves ambiguous how many rendering systems may be included in a given implementation, which graphics rendering system 204 performs which render passes 210, and so forth. It will be understood that this ambiguity is meant to illustrate the flexibility, adaptability, and customizability of dataflow 200 as rendering operations are directed, by way of rendering requests described herein, to be performed by any graphics rendering systems 204 as may best serve a particular application. For example, as described above, a rendering assistance system implemented on a powerful MEC server may be leveraged to do most or all of the rendering work in certain examples (with a corresponding media player device doing little or no rendering work), while, in other examples, the rendering assistance system may be utilized much more judiciously, with the media player device carrying most of the rendering load.

As mentioned above, each render output data 210-D represents a different partially-rendered image that is the output of a particular render pass 210. As will be described in more detail below, render operations associated with each render pass 210 may be organized and arranged, within a render request, to create any type of sequential or parallel processing pipeline as may be advantageous for a given implementation. For instance, each render pass may take as input data the render output data from a previous render pass 210 and provide resultant data as input to a subsequent render pass 210 that is being performed (e.g., either by the same or a different graphics rendering system 204). In this way, an image may be developed, render pass after render pass, in a sequential manner until all of the desired details are in place for the fully-rendered image (i.e., represented by fully-rendered image data 212D). In other examples, however, at least some render passes may be performed in parallel with one another, such that they take the same input data and each provide output data that must be combined in some way prior to achieving the fully-rendered image. Examples of this will be illustrated in more detail below.

Each graphics rendering system 204 may include various types of resources including central processors (e.g., central processing units ("CPUs")), graphics processors (e.g., graphics processing units ("GPUs")), memory resources, storage resources, and other suitable computing resources. Each graphics rendering system 204 may thus support asynchronous upload of input data, as well as download of output data, to either a CPU or a GPU of the system. Additionally, graphics rendering systems 204 may each support compression and streaming such that output results may be generated and transferred between graphics rendering systems (and to content presentation system 206) with relatively low latency.

In some examples, subsequent to the performing of all the render passes defined in a particular render request, output data representative of the image as partially rendered by these rendering passes may be provided back to the client system that originated the render request. For example, if the client system is a media player device in one particular example, the render request may include each of the render operations that are to be performed by the rendering assistance system on the MEC server, and the results of these operations are provided back to the requesting media player device. As mentioned above, in some examples, these results provided back to the client system may include a fully-rendered image configured for immediate presentation by the media player device. In other examples, however, the results may include output data representative of one or more partially-rendered images that are not yet ready for immediate presentation. In these examples, the client device may be configured to perform one or more additional rendering passes on the output data to thereby more fully render the image for presentation to the user by way of the media player device. As one example, the client device may add details represented in output data received from the rendering assistance system to a base rendering of the image rendered locally by the client system. As another example, the client device may combine or mix a plurality of different partially-rendered images received from the rendering assistance system to generate the final fully-rendered image for presentation.

Content presentation system 206 represents a media player device or other device that includes or has control of one or more display devices (e.g., a display monitor, a head-mounted pair of display monitors, etc.) and is configured to perform content presentation operation 212 by presenting the fully-rendered image of fully-rendered image data 212D. In some examples, content presentation system 206 may represent a plurality of different media player devices each located in different places and associated with different users that may all be configured to present the fully-rendered image represented by image data 212D.

Figure 4:
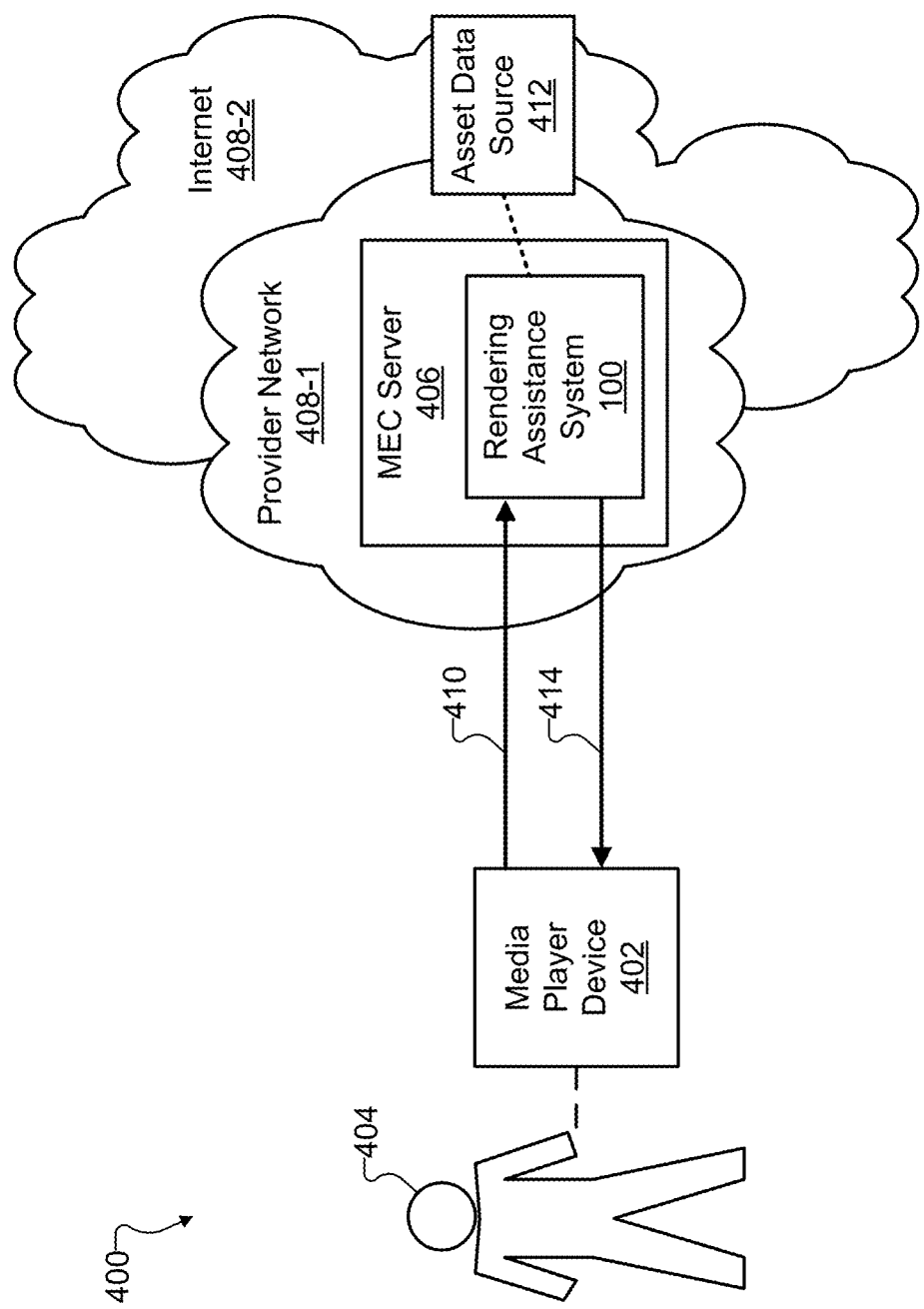
FIG. 4 illustrates an exemplary configuration in which a rendering assistance system operates to perform request-based graphics rendering at a multi-access edge compute ("MEC") server according to embodiments described herein.

FIG. 4 illustrates an exemplary configuration 400 in which system 100 operates to perform request-based graphics rendering at a MEC server according to principles described herein. As shown, FIG. 4 depicts a media player device 402 being used by a user 404. Media player device 402 is communicatively coupled with system 100, which, as shown, is implemented on a MEC server 406. MEC server 406 is shown to operate on and serve as a part of a provider network 408-1 that, as will be described in more detail below, may also provide access to other networks integrated with the Internet 408-2. System 100 was described above in relation to FIG. 1. Each of the other components shown in FIG. 4 will now be described in more detail.

Media player device 402 may be implemented as (or may be included within) any suitable computing system or device as may be employed for performing any of the use cases or applications described herein. To this end, media player device 402 may include one or more display screens (e.g., traditional display screens, partially transparent heads-up display ("HUD") screens, computer monitors, etc.) configured to display rendered graphics presented by media player device 402. Media player device 402 may be implemented as a mobile device (e.g., a smartphone, a tablet computing device, etc.), a virtual or augmented reality device (e.g., a head-mounted device configured to display graphics directly in front of each eye of user 404), a portable or stationary computing device (e.g., a personal desktop or laptop computer, etc.), a television device, or any other system or device as may serve a particular implementation.

User 404 may represent any person who views graphics presented by media player device 402. Typically, user 404 will have some degree of control over what graphics media player device 402 presents. For instance, in an extended reality or video game application example, user 404 may indicate a particular viewpoint within a scene from which user 404 wishes to view the world by moving an avatar around within the scene, turning to look in different directions, and so forth.

Provider network 408-1 may be implemented by a provider-specific wired or wireless communications network (e.g., a cellular network used for mobile phone and data communications, a 5G network or network of another suitable technology generation, a cable or satellite carrier network, a mobile telephone network, etc.), and may be operated and/or managed by a provider entity such as a mobile network operator (e.g., a wireless service provider, a wireless carrier, a cellular company, etc.). The provider of provider network 408-1 may own or control all of the elements necessary to sell and deliver communications services to user 404, including radio spectrum allocation, wireless network infrastructure, back haul infrastructure, customer care, provisioning of devices, network repair for provider network 408-1, and so forth.

In contrast, Internet 408-2 may include any interconnected network infrastructure that is outside of provider network 408-1 and outside of the control of the provider. For example, Internet 408-2 may include the Internet, a wide area network, a content delivery network, and/or any other suitable network or networks managed by any third parties outside of the control of the provider of provider network 408-1.

Both of provider network 408-1 and Internet 408-2 will be understood to provide data delivery between server-side provider systems and client-side systems and devices such as media player device 402. To this end, provider network 408-1 and Internet 408-2 may implement or employ any suitable communication technologies, devices, media, protocols, or the like as may serve a particular implementation.

MEC server 406 represents one or more computing systems (e.g., server computers), devices, nodes, or other collections of computing resources that are integrated within a provider network such as provider network 408-1 and configured for use by multiple users of the provider network. For example, MEC server 406 may be integrated within one or more radio access network ("RAN") resources, core network resources, service access point ("SAP") resources, or other suitable resources of provider network 408-1. As shown, MEC server 406 may be integrated within provider network 408-1 (e.g., deployed on provider network 408-1 as an edge node on the network so as to communicate with devices and systems connected to provider network 408-1 with low latency). For example, if provider network 408-1 includes or is implemented by 5G network technology, MEC server 406 may include or be implemented as a 5G node in a fixed 5G deployment, a mobile 5G deployment (e.g., a network on wheels), or another suitable deployment.

Because MEC server 406 is integrated within (e.g., implemented as part of) provider network 408-1, it will be understood that MEC server 406 is separate from client systems served by MEC server 406 such as media player device 402. Additionally, because a MEC server may include shared resources that can be leveraged by multiple client systems (e.g., multiple media player devices, etc.), it may be efficient and economical for MEC server 406 to employ a considerable wealth of computing power (e.g., significantly more computing power and resources than may be practical to include within media player device 402). For instance, MEC server 406 may include a plurality of parallel processors (e.g., CPUs, GPUs, etc.) for efficiently performing various advanced and processing-intensive rendering operations that may be performed by system 100, as described herein.

Moreover, because MEC server 406 is deployed on provider network 408-1, there may be a very low transport latency associated with exchanging data between MEC server 406 and media player device 402, thereby allowing MEC server 406 to perform tasks for media player device 402 with high responsiveness that will appear to user 404 to be instantaneous (e.g., as if the tasks are being performed locally on media player device 402). In some examples, the latency associated with operations performed by MEC server 406 may be unperceivable by user 404, thereby enabling and bolstering the real-time nature of system 100 described above.

MEC server 406 may also be differentiated from computing resources deployed outside of provider network 408-1. For example, cloud servers (not explicitly shown in FIG. 4) may be available for processing client data such as data for media player device 402, but these cloud servers may be operated by third parties other than the provider of provider network 408-1. As such, communication with such cloud servers may be performed only by way of both networks 408 (i.e., provider network 408-1 and Internet 408-2), rather than just by way of provider network 408-1, potentially adding significant latency as compared to the latency achieved with communications to MEC server 406 directly by way of provider network 408-1.

In some examples, system 100 may be implemented by such cloud servers or other non-MEC multi-access servers associated with relatively large latencies when communicating with media player device 402. For instance, for rendering operations that are less time critical (e.g., rendering a large sprite sheet when a level of a game is loading, etc.), an implementation of system 100 on a multi-access server associated with a relatively long latency may still provide a significant improvement (e.g., an order of magnitude improvement) as compared to if the media player device performed the rendering operation by itself. In such examples, the latency associated with the multi-access server implementing system 100 has less of an impact on system performance than the processing capabilities (e.g., the throughput) of the server, and thus various benefits (e.g., faster level loading time, etc.) may be achieved using a cloud server or other non-MEC multi-access server. At the same time, however, it will be understood that the benefits described herein of real-time and ultra-low-latency graphics rendering (e.g., graphics rendering with latency that is unperceivable by users) generally require system 100 to be implemented at the edge of provider network 408-1 by a low-latency MEC server such as MEC server 406, as shown in configuration 400.

As described above, system 100, integrated within MEC server 406, may be configured to perform request-based graphics rendering as requested by media player device 402 to generate high quality graphics in a manner that may be faster, more efficient, and/or otherwise beneficial over media player device 402 performing the graphics rendering using its own computing resources. For example, one or more advanced rendering passes may be performed on MEC server 406 that would not be feasible, practical, and/or efficient to perform on media player device 402. In this sense, system 100 may perform request-based graphics rendering as a dynamic service for media player device 402, and, as will be described in more detail below, may stream the resulting images (e.g., partially-rendered or fully-rendered images, as defined by the request) to media player device 402. As this service is performed, it will be understood that other rendering operations (e.g., more crucial rendering operations, more basic rendering operations, etc.) may still be reserved to be performed locally by media player device 402, such that the overall rendering is bifurcated between system 100 and media player device 402.

In configuration 400, media player device 402 will be understood to implement the client system that generates and provides a request 410 to system 100. For example, media player device 402, as the client system, may generate and provide to system 100 (e.g., automatically or under direct or indirect control of user 404) request 410, which may represent any of the types of render requests described herein. Subsequent to accessing input data from an asset data source 412 (based on an asset pointer included within request 410), and subsequent to performing one or more rendering passes on the input data (in accordance with one or more requested rendering operations defined within request 410), system 100 may provide, to media player device 402 (as the client system that made the initial request), output data 414 representative of an image as partially or fully rendered by the one or more rendering passes performed by system 100. Request 410, asset data source 412, and output data 414, as well as various exemplary ways that system 100 may perform or facilitate request-based graphics rendering at a MEC server within configuration 400, will now be described in more detail in relation to FIGS. 5-10. FIG. 11 will then be described to illustrate another exemplary configuration that may be employed instead of configuration 400 in certain implementations.

FIG. 5 shows a request 410-1, which will be understood to be a relatively basic example of one of the rendering requests 410 described and illustrated above in relation to FIG. 4. As with other requests 410, request 410-1 may be configured to be the basis of graphics rendering performed by system 100 according to principles described herein.

Each request 410 may indicate or represent various types of information described herein (e.g., data pointers, requested rendering operations, various types of parameters, etc.), and may do so using any form or format of data as may serve a particular implementation. For example, as illustrated by request 410-1, a relatively straightforward and human-readable data format such as a JavaScript Object Notation ("JSON") format may be used in certain implementations. Other implementations may utilize requests represented using other human-readable data formats (e.g., XML, YAML, etc.) or using suitable machine-readable or binary formats as may serve a particular implementation.

In the example of FIG. 5, request 410-1 is shown to indicate certain input data, which is identified in an "assets" block and is to be processed by one or more requested rendering operations, which are identified in a "renderPasses" block. Specifically, as shown, when request 410-1 is parsed by system 100, an asset pointer to a particular file path ("filename": "images/image.png") found on a particular asset data source 412 ("source": "filesystem", which may represent a local data storage facility of MEC server 406) is identified that is to be used as an input image to be processed. This asset is assigned a particular identification number ("id": 101) to allow the data to be referenced elsewhere in the request. Moreover, the parsing of request 410-1 further identifies a requested rendering operation ("type": "PPUnitImage", which is a rendering operation configured to load image data into texture) that is selected from a plurality of rendering operations supported by system 100 (an exemplary list of which will be described in more detail below). This rendering operation is indicated to be performed on the asset data mentioned above ("assetID": 101), and is given its own identification number ("id": 1) and name ("name": "imagesource").

Accordingly, based on request 410-1, system 100 may be configured to access a storage facility of MEC server 406 and load a particular asset or instance of input data (i.e., an image stored at "images/image.png") to be processed by one or more additional rendering operations. In the basic example of request 410-1 in FIG. 5, no further rendering operations are shown to be requested, so system 100 may simply return an unprocessed version of the loaded image ("image.png") to the requesting client system (e.g., to media player device 402 in this example). In other more complex examples, however, one or more additional render operations may be performed in one or more additional render passes prior to returning resultant data to the requestor. For example, in certain implementations, system 100 may be configured, along with parsing a request to identify one requested rendering operation, to further parse the same request to identify an additional requested rendering operation (e.g., an additional requested rendering operation that is also selected from the plurality of rendering operations supported by system 100). The additional requested rendering operation that is identified may be distinct from the first requested rendering operation, and the performance of a first rendering pass may include generating intermediate data representative of the image as partially rendered by the first rendering pass. As such, system 100 may be further configured, subsequent to performing the first rendering pass to generate the intermediate data, to perform an additional rendering pass on the intermediate data. For instance, the additional rendering pass may be performed in accordance with the additional requested rendering operation to more fully render the image for presentation to the user by way of the media player device.

To illustrate, FIG. 6 shows a request 410-2, which will be understood to be a more complex example (i.e., more complex than request 410-1) of one of the rendering requests 410 described and illustrated above in relation to FIG. 4. As with other requests 410, request 410-2 may be configured to be the basis of graphics rendering that is performed by system 100.

Similar to request 410-1, request 410-2 is shown to indicate and represent various types of information (e.g., data pointers, requested rendering operations, various types of parameters, etc.) using a relatively straightforward and human-readable data format such as a JSON format. However, while the rendering pass defined in request 410-1 loaded and provided an image to the requesting client system without first performing any additional processing on the image (as described above), request 410-2 defines rendering operations for loading two different images and several additional rendering operations that are to be performed on the images prior to resultant output being provided back to the requesting client system.

Specifically, as shown in FIG. 6, request 410-2 identifies two different sources of input data in its respective "assets" block, as well as five different rendering operations in its respective "renderPasses" block. The input data identified by the parsing of the "assets" block, for example, are indicated by asset pointers to two particular file paths ("filename": "images/image1.png" and "filename": "images/image2.png") that are both to be found on the asset data source 412 implemented, as described above, on the local data storage facility of MEC server 406 ("source": "filesystem"). These assets are assigned different respective identification numbers ("id": 101 for "image1.png" and "id": 102 for "image2.png") to allow the data to be referenced elsewhere in the request.

Additionally, the parsing of request 410-2 further identifies several requested rendering operations that are each selected from a plurality of rendering operations supported by system 100. Specifically, for example, the first two rendering operations are of "type": "PPUnitImage", which as mentioned above is a rendering operation configured to load image data into texture, while the next three rendering operations are of "type": "PPUnitInOut", which is a rendering operation type that is configured to take input from the output of other rendering passes and to apply certain shading, scaling, and/or other effects to the input data in accordance with other parameters defined in the request. For example, system 100 may further parse request 410-2 to identify rendering operation parameters (e.g., "shaderComponent" parameters, "scaleFactor" parameters, "sourceMultiplier" parameters, etc.) associated with the requested rendering operation and indicative of how the rendering pass is to be performed.

Between the selected rendering operation types and rendering operation parameters defined within request 410-2, various rendering operations may be set up for performance from a plurality of rendering operations that may be supported by system. The overall set of supported rendering operations may involve various types of operations such as those specifically shown in FIG. 6, as well as various others that may be defined and used in a particular implementation. For example, one implementation may include, without limitation, any of the following types of rendering operations:

1. A mesh shader operation
2. A material shader operation
3. A texture coordinate shader operation
4. An animation shader operation
5. A particle position shader operation
6. A compute lighting shader operation for per-pixel lighting with dynamic lights specified for a material
7. A point light shader operation to support dynamic per-pixel point lights
8. A spotlight shader operation to support dynamic per-pixel spotlights
9. A directional light shader operation to support dynamic per-pixel directional lights
10. A font atlas alpha operation for supporting an alphabet atlas
11. A fontSDF operation for text rendering using a signed distance field technique
12. A transition effect operation for film-like transitions with different types of patterns (e.g., fade in, fade out, fade to black or to another specific color/texture, etc.)
13. A Gaussian blur operation to apply a one axis at a time Gaussian blur with controls for radius, curve, direction, etc.
14. A bright pass operation to eliminate everything below a certain brightness threshold (e.g., used for high dynamic range ("HDR") images, etc.)
15. A glow pass operation similar to the bright pass operation that reads an emissive material parameter rather than using the brightness threshold (e.g., used for non-HDR images, etc.)
16. A compose operation that blends together multiple input images and takes sourceMultiplier parameters to determine how to weight each input in the final output with respect to the other inputs
17. A YUV conversion operation to convert color values from the RGB (red-green-blue) color space to the YUV (luma-blue-red) color space
18. A distortion effect operation to create full screen alpha blending effects (e.g., full screen refraction effects, etc.)
19. A physically-based rendering operation that takes roughness and metal parameters and supports irradiance/radiance shading using environment map (e.g., cubemap, octahedral map, etc.) projections
20. A luminance operation used to convert a frame to luminance values
21. An adapted luminance operation used to normalize an input frame according to a weighted average luminance
22. A tone mapper operation used to perform HDR tonemapping
23. A fog effect operation that provides linear and exponential fog
24. A projected texture operation
25. A shadow map operation
26. A color correction operation to support color operations such as gamma correction, exposure, static tone mapping, etc.
27. A convolution operation that operates on an environment map to generate irradiance from a panoramic image
28. An image-based lighting material operation used for applying an irradiance map to a material and also supporting directional occlusion with a pre-generated directional occlusion map
29. An importance sample that operates on an environment map to generate a radiance mip map chain for physically-based rendering materials 30. A hair shader operation for real-time hair shading 31. A hair from look-up-table shader operation for reduced processing hair shading that utilizes a look-up-table for a full range of input data angles rather than performing full, real-time hair shading 32. A hair environment map shader operation for shading hair via image instead of via light direction 33. A subsurface material shader operation used to generate subsurface lighting effects to give materials a softer glow 34. An object space unwrap shader operation for unwrapping a model into texture space 35. An eyeball shader operation 36. A car paint shader operation Any of these or various other rendering operations may be included as default rendering operation options included within a selection of supported rendering operations for a particular implementation. For instance, the selection of supported rendering operation may be selectable from an Application Programming Interface ("API"), a menu, or any other suitable data structure. While rendering operations such as those listed above may serve as default or system rendering operations made available to the system in certain implementations, it will be understood that fully-custom and/or customizable rendering operation options (e.g., rendering operations developed by users of the rendering assistance system) may also be included among the plurality of rendering operations supported by certain implementations of the rendering assistance system. A rendering request such as request 410-2 may identify one or more default or custom rendering operations available to the system and pass in appropriate parameters to define how the rendering operations are to be performed. For example, each different rendering operation in the list of supported rendering operations may be associated with an identifier (e.g., a short identifier such as a two-letter identifier with a hexadecimal number to indicate certain properties of the instantiated shader), as will be described in some of the following exemplary rendering operations selected in request 410-2:

1. a first rendering operation with an identification number 1 ("id": 1) and a name "imagesource1" ("name": "imagesource1") that loads "image1.png" by using the appropriate rendering operation and asset ("type": "PPUnitImage" and "assetID": 101), 2. a second rendering operation with an identification number 2 ("id": 2) and a name "imagesource2" ("name": "imagesource2") that loads "image2.png" by using the appropriate rendering operation and asset ("type": "PPUnitImage" and "assetID": 102), 3. a third rendering operation with an identification number 3 ("id": 3) and a name "blurx" ("name": "blurx") that operates on "image1.png" as loaded by the first rendering operation ("parent": 1) and performs a certain type of Gaussian blur operation (associated with a two-letter identifier "GB" and a hexadecimal number "1") to generate a blurred version of "image1.png" scaled to twice the original size by defining appropriate rendering operations and parameters ("type": "PPUnitInOut", "scaleFactor": 2.0, and "shaderComponent": "GB.1"), 4. a fourth rendering operation with an identification number 4 ("id": 4) and a name "tonemap" ("name": "tonemap") that operates on "image2.png" as loaded by the second rendering operation ("parent": 2) and performs a certain type of tonemapper operation (associated with a two-letter identifier "TM" and a hexadecimal number "0") to generate a tone-mapped version of "image2.png" at the original scale by defining appropriate rendering operations and parameters ("type": "PPUnitInOut", "scaleFactor": 1.0, and "shaderComponent": "TM.0"), and 5. a fifth rendering operation with an identification number 5 ("id": 5) and a name "mix" ("name": "mix") that operates on the processed versions of both "image1.png" from the blurring rendering operation and "image2.png" from the tonemapping rendering operation ("parents": [3,4]), and performs a blending or mixing of the two intermediate rendering pass results using a certain type of compose operation (associated with a two-letter identifier "CP" and a hexadecimal number "0") to generate a blended version of the images that weights each image equally (i.e., in accordance with a source multiplier parameter of 1.0) at the original scale by defining appropriate rendering operations and parameters ("type": "PPUnitInOut", "scaleFactor": 1.0, "shaderComponent": "CP.0", "source1 Multiplier": 1.0, and "source2Multiplier": 1.0).

Accordingly, based on request 410-2, system 100 may be configured to access a storage facility of MEC server 406 and load two different assets or instances of input data (i.e., respective images stored at "images/image1.png" and "images/image2.png") to be processed by blur, tonemap, and mixing operations as described above.

Figure 7:
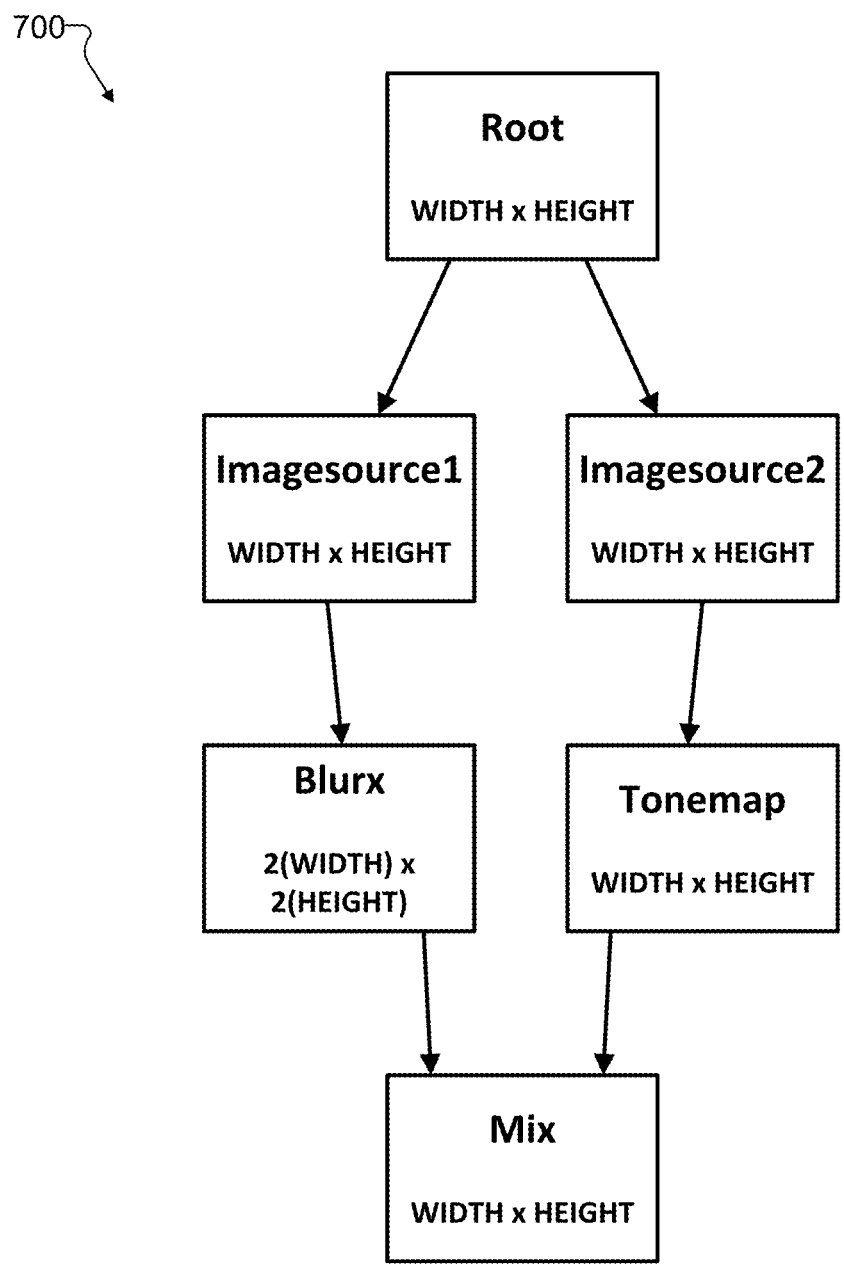
FIG. 7 illustrates an exemplary graphical representation of the requested rendering operations represented within the rendering request of FIG. 6 according to embodiments described herein.

To further illustrate, FIG. 7 shows a graphical representation 700 of the requested rendering operations represented within request 410-2, starting with a "Root" point (where no rendering operations of request 410-2 have yet been performed) and proceeding to perform the imagesource1 and imagesource2 rendering operations, the blurx and tonemap rendering operations, and the mix rendering operation, as shown. At each rendering operation, the output data is indicated with a particular width and height to indicate scaling that may be performed as part of the rendering operation (e.g., including the scaling by 2.0 in the blurx rendering operation that was described above). Accordingly, when system 100 has completed all of the rendering operations identified in request 410-2, the final resultant output of the mix rendering operation may be returned to the requesting client system (e.g., to media player device 402 in this example) or to another appropriate system as indicated by the request.

As described above in relation to FIG. 6 and as shown graphically by representation 700 in FIG. 7, a given rendering request such as request 410-2 may define render operations to be performed in any suitable order and way, including to be performed in sequence or in parallel. In this way, system 100 may perform various rendering passes associated with various rendering operations with great flexibility and customizability as may best serve a particular set of input data (based on the request). For instance, certain rendering passes may be dependent on other rendering passes and may be aligned in sequence with those rendering passes (e.g., the blurx rendering pass is shown in FIG. 7 to depend from the imagesource1 rendering pass, etc.). At the same time, other rendering passes may be performed independently and may be aligned in parallel with other rendering passes from which they do not depend (e.g., the blurx rendering pass is shown in FIG. 7 to not depend from, but to be performed independently from, the tonemap rendering pass, etc.).

This flexibility in independence and interdependence of rendering passes may allow different rendering passes to be performed at different frame rates or refresh rates, to be performed by different hardware resources (e.g., different GPUs or CPUs, different implementations of system 100 on different MEC servers, different types of computing systems such as MEC servers and media player devices and cloud servers, etc.), for certain rendering passes to be periodically skipped without detracting from other rendering passes (e.g., when connectivity issues arise such that output data is not exchanged within real-time timing constraints, etc.), and so forth.

While specific images (e.g., "image.png" for request 410-1 and "image1.png" and "image2.png" for request 410-2) have been specifically described for the exemplary requests 410 above, it will be understood that, in certain examples, a rendering request (e.g., one of requests 410) may be used to set up a rendering pipeline through which multiple images (e.g., each frame of a frame sequence stored in a video file or the like) may be processed. In this way, a single request 410 may be used to set up a render pipeline configured to receive, process, and provide a constant stream of image data. For example, along with parsing a request to identify a first requested rendering operation, system 100 may further parse the request to identify a set of requested rendering operations (i.e., where the set includes the first requested rendering operation) that are all selected from the plurality of rendering operations supported by system 100. This type of request may indicate, in any suitable way, that the set of requested rendering operations are to form a rendering pipeline through which a plurality of frames included in a frame sequence are to be processed. As such, the asset pointer identified in the request may be usable by system 100 to access (i.e., as the input data for the rendering operations) the frame sequence from the asset data source. For example, rather than an image such as "image.png", the asset to be processed may be a video such as a "video.mp4".

Returning to FIG. 4, system 100 may receive request 410 and perform any of the rendering operations identified therein based on input data (e.g., an image or video asset) that is accessible by way of an asset pointer included within the request 410. The asset pointer may be usable by system 100 to access input data from asset data source 412, which may be implemented in any location or manner as may serve a particular implementation. In FIG. 4, asset data source 412 is connected to system 100 by a dotted line and drawn at a location near system 100 and MEC server 406 that leaves some ambiguity as to whether asset data source 412 is to be associated with MEC server 406 or another system on provider network 408-1, with a system on Internet 408-2, or with another system. This ambiguity is depicted in FIG. 4 intentionally to illustrate that asset data source 412 may be implemented by various types of systems communicatively coupled with (or integrated into) system 100 in various ways.

For example, as described above in relation to FIGS. 5 and 6, asset data source 412 may, in certain implementations, be implemented on data storage resources of system 100 itself (e.g., storage facility 102) or at least on data storage resources of MEC server 406. In such examples, asset data source 412 would be MEC server 406 itself, and the identified asset pointer in request 410 would include a link or URL to a file location within MEC server 406 at which the input data is stored (e.g., a link to a location on the filesystem, such as in the "images/" folder as described above in relation to requests 410-1 and 410-2).

Figure 8:
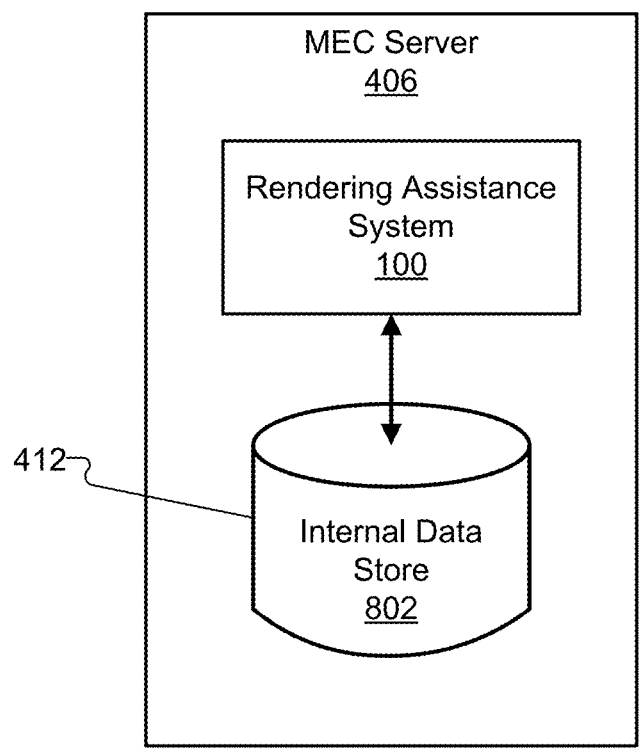
FIGS. 8-9 illustrate exemplary implementations of an asset data source from which a rendering assistance system may access input data for graphical rendering according to embodiments described herein.

To illustrate this type of example, FIG. 8 shows an exemplary implementation of asset data source 412 that is local to MEC server 406. Specifically, as shown in FIG. 8, MEC server 406 is shown to include, along with an implementation of system 100, an internal data store 802 that is communicatively coupled with system 100 and that implements asset data source 412 for a particular asset pointer in a particular request 410. For example, an input data asset may be accessed by system 100 from internal data store 802 using the file path "images/image.png" in the example of request 410-1, or two input data assets may be accessed from internal data store 802 using the respective file paths "images/image1.png" and "images/image2.png" in the example of request 410-2. In such examples, various assets such as materials, models, textures, backgrounds, and so forth may be integrated directly into a disk image loaded onto internal data store 802 such that input assets can be loaded locally from disk. For instance, assets may be packaged into a docker image with the server so as to make it possible for a custom runtime to be deployed through a provisioning API specific to a client account. In this way, an experience with pre-generated content (e.g., a game, etc.) may involve assets that all exist locally in the same runtime within the server. For other experiences, a default set of example assets may be included.

In some examples, the asset pointer may indicate that input data is to be accessed from an asset data source that is not local to system 100 or MEC server 406. For instance, in these examples, asset data source 412 may be implemented by an external data store separate from and communicatively coupled to MEC server 406, and the asset pointer may include a link or URL to a file location within the external data store at which the input data is stored.

Figure 9:
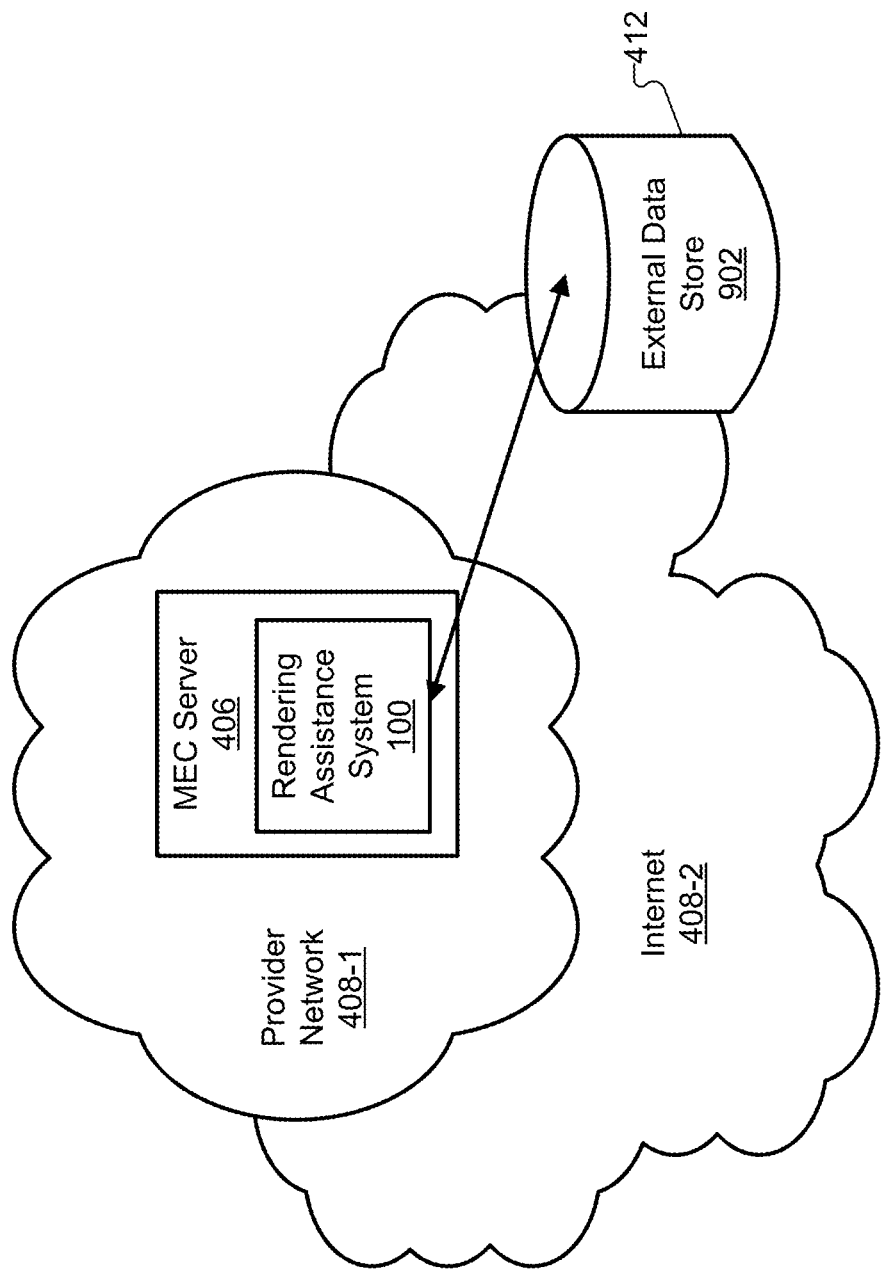

To further illustrate this type of example, FIG. 9 shows an exemplary implementation of asset data source 412 that is separate from and communicatively coupled to MEC server 406. Specifically, as shown in FIG. 9, MEC server 406 is shown to include the implementation of system 100, while an external data store 902 that is separate from and communicatively coupled with system 100 is shown to implement asset data source 412 for a particular asset pointer in a particular request 410. External data store 902 is drawn so as to be associated with Internet 408-2 in FIG. 9, rather than with provider network 408-1, although it will be understood that an external data store 902 may be associated with either network 408-1 or 408-2. In various examples, external data store 902 may be an external database used by MEC server 406, a storage facility of a cloud server (e.g., a state server associated with a gaming or extended reality application being provided by media player device 402, etc.), or any other external data source as may serve a particular implementation. As with internal data store 802, external data store 902 may include data assets such as single images (e.g., images associated with models, textures, materials, etc.) and/or image sequences that can be accessed by system 100 by way of either a single image request or a streaming request, respectively. Such assets may be cached on data storage facilities local to MEC server 406 after being loaded from external data store 902 on the cloud.

In still other examples (not explicitly illustrated by FIG. 8 or FIG. 9), input data may be accessed by system 100 from other suitable sources, or as part of the request 410 itself. For instance, the request 410 may include, as its asset pointer, metadata (e.g., a packet header, etc.) or another suitable representation that indicates to system 100 that the input data is included as part of the request 410 itself, or may otherwise be accessed from the requesting client system (e.g., from media player device 402).

Returning to FIG. 4, system 100 may perform any of the rendering operations that may be identified from the request 410 on any input data asset that may identified from an asset pointer included in the request 410 in any manner as may serve a particular implementation. For example, some of the supported rendering operations listed as being supported by one exemplary implementation of system 100 above may be performed in conventional ways well known to those of skill in the art, while other supported rendering operations may be less well known or completely novel.

Figure 10:
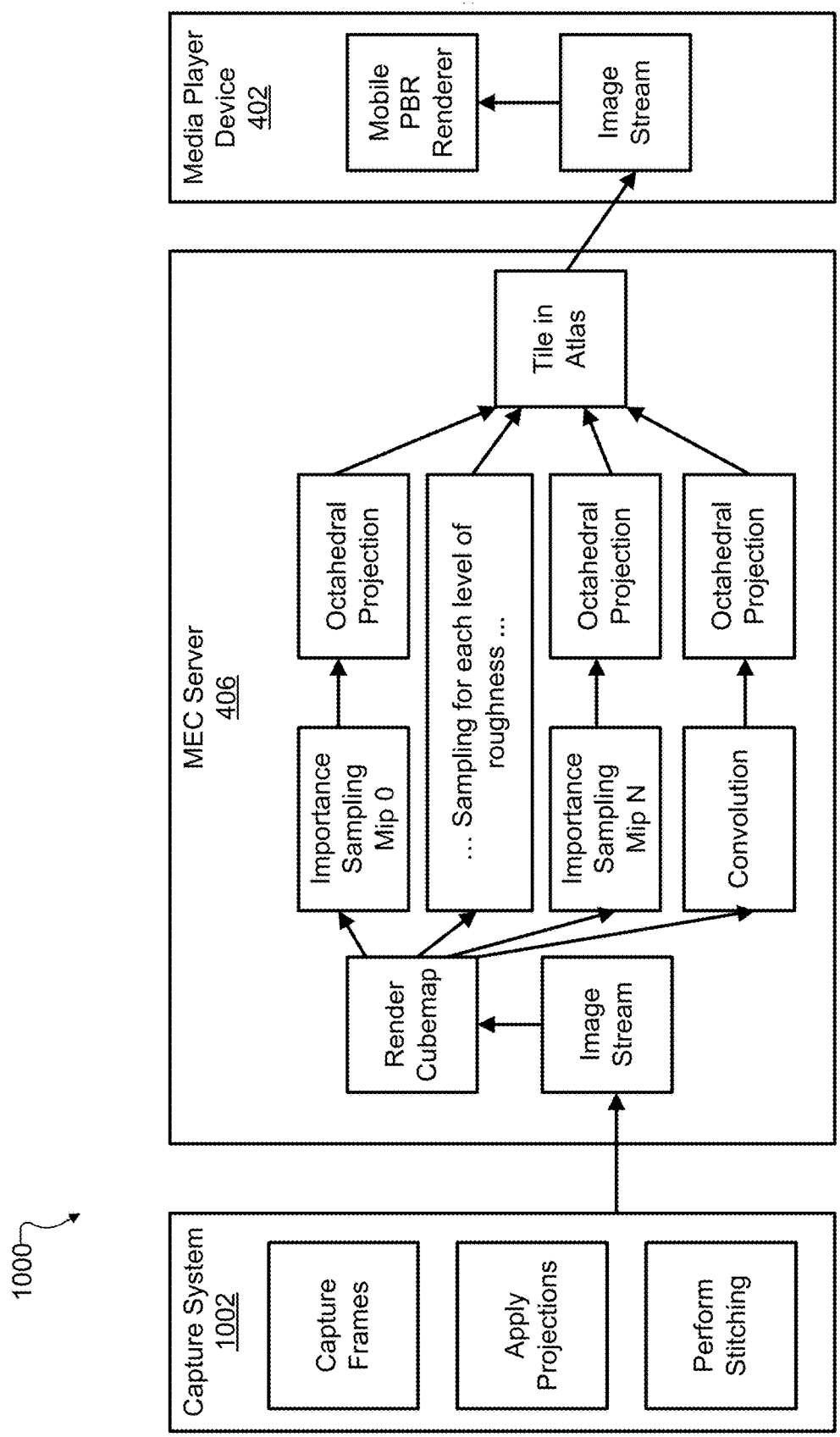
FIG. 10 illustrates operational details of an exemplary physically-based rendering operation that may be performed by rendering assistance systems and methods according to embodiments described herein.
Figure 11:
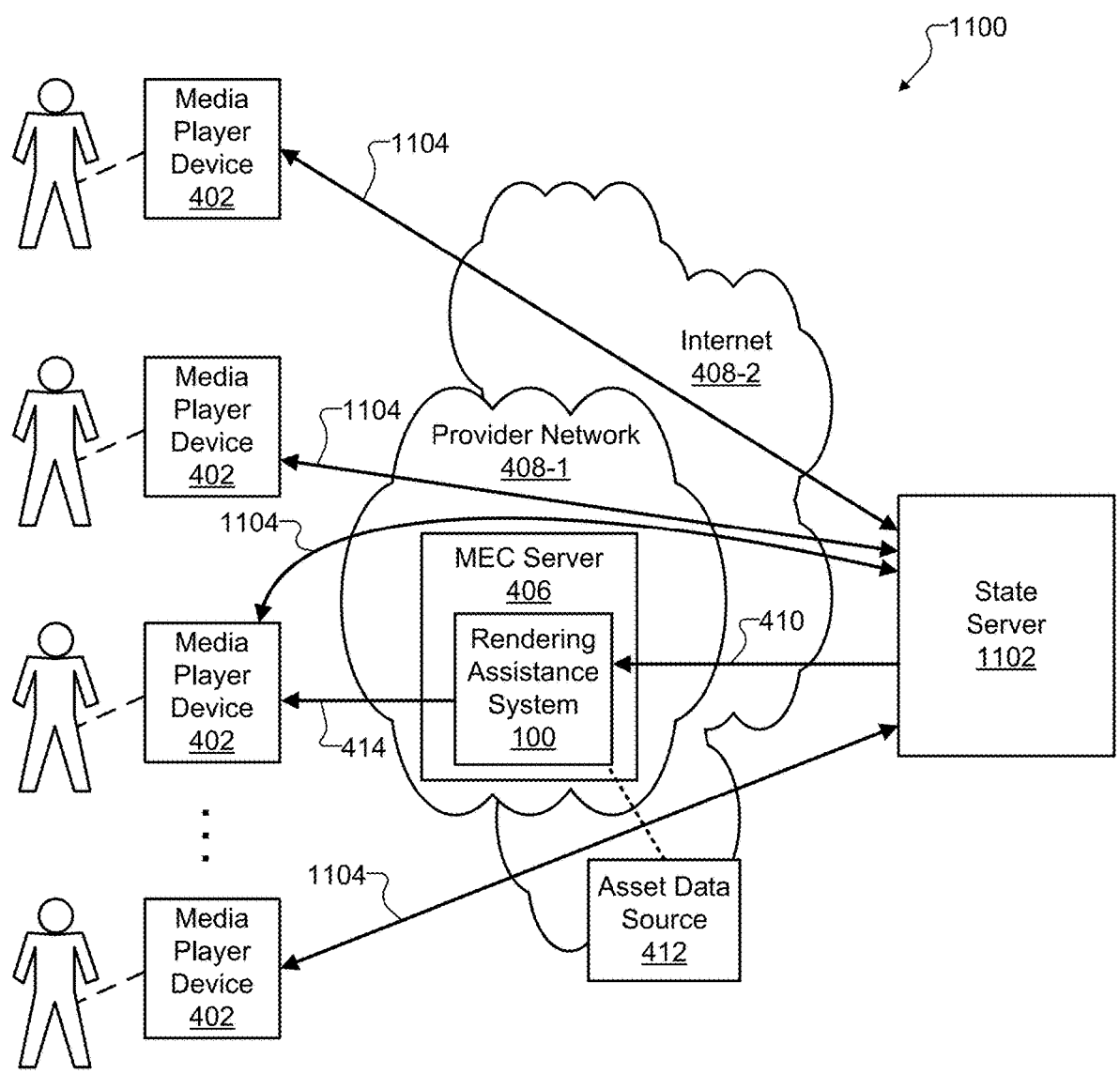
FIG. 11 illustrates an additional exemplary configuration in which a rendering assistance system operates to perform request-based graphics rendering at a MEC server according to embodiments described herein.

FIG. 10 provide a detailed illustration of one exemplary novel rendering operation that may be performed by system 100 if requested for a particular image (i.e., if included in a particular request 410). More particularly, FIG. 10 shows operational details of an exemplary physically-based rendering operation. In this example, system 100 (which, as shown in FIG. 4, may be implemented on MEC server 406) may receive a request (e.g., an implementation of a request 410) from a client system that is separate from the MEC server (e.g., media player device 402 or another suitable client system described herein). In response to receiving the request, system 100 may determine that the request includes 1) an asset pointer usable by system 100 to access input data from an asset data source (e.g., asset data source 412, as described above), and 2) an indication that a physically-based rendering operation is to be performed with respect to the input data. Accordingly, based on the asset pointer, system 100 may access the input data from the asset data source, and may perform, in accordance with the request, the physically-based rendering operation with respect to the input data. As shown by FIG. 10, the physically-based rendering operation may be performed by generating a plurality of octahedral lightmaps based on the input data, combining the plurality of octahedral lightmaps onto an atlas sheet, providing the atlas sheet for use in rendering an image that is to be presented to a user (e.g., user 404) by way of a media player device (e.g., media player device 402), and/or any other suitable operations as illustrated by FIG. 10 and/or as may serve a particular implementation.

A block diagram 1000 in FIG. 10 illustrates three computing systems that may interoperate to process data to receive the benefits of physically-based rendering without necessarily requiring an end user device to include powerful processing resources. Specifically, as shown, a capture system 1002, may be communicatively coupled with MEC server 406, which, as described above, may also be communicatively coupled to media player device 402. Using the novel approach of FIG. 10, media player device 402 implementations such as relatively early generation smartphones and/or other mobile devices with relatively modest hardware resources may be able to present extremely realistic and lifelike renderings based on physically-based rendering techniques.

As shown in block diagram 1000, capture system 1002 may be configured to capture lighting data, such as by capturing frames, applying projections, and performing stitching of different captured images. In this way, capture system 1002 may generate and provide lighting data in an image stream received by MEC server 406. In some examples, the image stream provided by capture system 1002 and received by MEC server 406 may include a panoramic image such as a 360° image. This lighting data may be rendered or converted to an environment map (e.g., a cubemap, an octahedral map, etc.) that represents radiance and irradiance data for the scene. The radiance data may represent a reflection that is sampled at a particular resolution to preserve a particular energy level, while the irradiance data may represent an accumulation of light for each outgoing direction that is projected onto a sphere and stored in the environment map. While such environment maps may be conveniently processable by rendering systems with powerful resources, a large number of environment maps may be required to cover various levels of brightness, roughness, and so forth that may be included in the mip maps of a particular implementation of the physically-based rendering approach. Accordingly, after performing importance sampling for each level of brightness, roughness, etc., the resultant data may be converted from an environment map format to an octahedral projection that can be easily tiled in an atlas image that may include a plurality of such octahedral projections. For example, irradiance and radiance data may be extracted and combined into a full-resolution, non-mipmapped image that can be readily loaded by the client system, even if the client system is implemented by a media player device 402 with relatively modest processing resources. Upon receiving the atlas image in an image stream, media player device 402 may be capable, by way of a mobile-friendly physically-based rendering system ("Mobile PBR Renderer"), of performing a shading rendering operation whereby every pixel is shaded using a relevant region selected from an appropriate one of the full-resolution octahedral projections in the atlas image, or, in certain implementations, using an interpolation between such projections.

The physically-based rendering described above and illustrated in block diagram 1000 provides a relatively simple example of hybrid rendering in which MEC server 406 needs no knowledge of the application state (e.g., what is currently happening in the video game, extended reality experience, 3D simulation, etc.) and does not need access to any assets of the application (since the only input is the lightmaps captured by capture system 1002). In other examples, it will be understood that MEC server 406 may require various assets and/or may receive requests from a separate client system.

Returning again to FIG. 4, output data 414 is shown to be provided from system 100 back to media player device 402 (the device that provided the request 410 in this example) subsequent to the performing of any rendering passes associated with any of the rendering operations described above. Output data 414 may represent any suitable type of output data and may take any form as may serve a particular implementation. For example, output data 414 may be representative of an image as partially or fully rendered by system 100 by way of one or more rendering passes requested in the request 410, and may be formatted in a compressed format (e.g., a JPEG or PNG format for a single image, an h.264 or h.265 for a video image, etc.), or an uncompressed format (useful for certain HDR images) as may be most appropriate or advantageous for a given example.

Output data 414 may be provided in response to the request 410 received from media player device 402 in configuration 400 and, in this configuration, the output data may be provided back to media player device 402 for presentation to user 404. In other configurations, however, it may be desirable for system 100 to provide output data 414 to a client system that is different from the client system that provided the initial request 410. For instance, a multiplayer gaming example will be considered that involves a plurality of players each using separate media player devices 402 and each located at different locations (e.g., in different parts of the country or the world). Each of the media player devices in this example may be communicatively coupled to respective MEC servers that are relatively localized to the media player devices (i.e., at the edge of the provider network providing communication services to the media player devices), as well as to a single dedicated server (e.g., a cloud server external to the provider network) that is located at a centralized location that is not necessarily particularly nearby any of the media player devices. This dedicated server may be a game server or other state server, for example, that is responsible for tracking and providing state data to each of the media player devices to indicate where other players are moving, what other players are doing, what is happening in the world of the game, and so forth.

In this example, the client system that provides the request 410 to a particular MEC server 406 associated with a particular media player device 402 may be implemented by a state server separate from the media player device, such that the state server provides the request 410 to an implementation of system 100 on behalf of the media player devices 402. As such, the system 100 implementation may provide, subsequent to the performing of any requested rendering passes, output data representative of the image as partially or fully rendered by the system 100 implementation by way of one or more requested rendering passes. Specifically, this implementation of system 100 may provide the output data in response to the request received from the state server on behalf of the particular media player device 402, and may provide the output data to the particular media player device 402 for presentation to the respective user of that media player device.

To illustrate, FIG. 11 shows an exemplary configuration 1100 in which system 100 operates to perform request-based graphics rendering at a MEC server, but that is different from configuration 400 described above. In configuration 1100 of FIG. 11, a state server 1102 (e.g., a game server, a centralized extended reality state tracker, etc.) is shown to be communicatively coupled by way of respective communication links 1104 to a plurality of media player devices 402 such as those that have been described above. As described above, state server 1102 may receive data from each media player device 402 that is associated with a shared experience (e.g., a multi-player video game, a shared extended reality experience or simulation, etc.) that each of the users of the media player devices is engaged in. Based on this data, state server 1102 may update the state of the game or simulation and keep each of the other media player devices 402 apprised of this current state so that each media player device 402 can access the same information about the same virtual world. Configuration 1100 shows state server 1102 to be communicating with each media player device by way of Internet 408-2 and, in some examples, also by way of provider network 408-1. It will be understood that state server 1102 may be implemented by any suitable computing system coupled with the media player devices it serves in any suitable manner and by way of any network or networks.

In FIG. 11, a single implementation of MEC server 406 in which a single implementation of system 100 is included is shown to be associated with a particular media player device 402. It will be understood, however, that this same MEC server 406 and system 100 implementation may further serve other media player devices 402 (if those devices are located relatively nearby the MEC server 406) and/or that other implementations of MEC server 406 and/or system 100 (not explicitly shown) may be associated with and configured to serve other media player devices 402 (e.g., devices that are not located relatively nearby the MEC server 406 that is explicitly shown). As illustrated, it is state server 1102 that provides the request 410 to system 100 in configuration 1100. For example, state server 1102 may provide the request 410 on behalf of one or more of the media player devices 402. However, subsequent to parsing the request 410 and performing any requested rendering passes identified in the request 410, system 100 is shown to provide output data 414 not to the requesting state server 1102, but directly to one or more of the media player devices 402 (on whose behalf state server 1102 provided the request).

For example, each media player device 402 may subscribe to certain output streams (e.g., including an output stream that includes output data 414) that are established by state server 1102 so as to receive partially or fully rendered image or video data as may be desirable (and as defined in requests 410 that state server 1102 generates). In some examples, each media player device 402 may first upload assets to MEC server 406 or state server 1102, and may then make a streaming request. Based on the streaming request, the media player devices 402 may subscribe to the appropriate data stream. In other examples, state server 1102 may upload assets and make a streaming request, but may not subscribe to the resultant data stream because the streaming request is provided for the benefit of other client systems (e.g., media player devices 402). In still other examples, one media player device 402 may generate and subscribe to a data stream, and a separate media player device 402 may query to find out which streams are active and may subscribe to the same stream that was created by the other media player device 402. In addition to requesting the output of the other media player device's stream, the second media player device may also make a new request that uses the first request as input. In this way, a distributed render graph may be generated that uses image streams to buffer the data on either side, thus making the rendering rate of each MEC server and client system independent.

Figure 12:
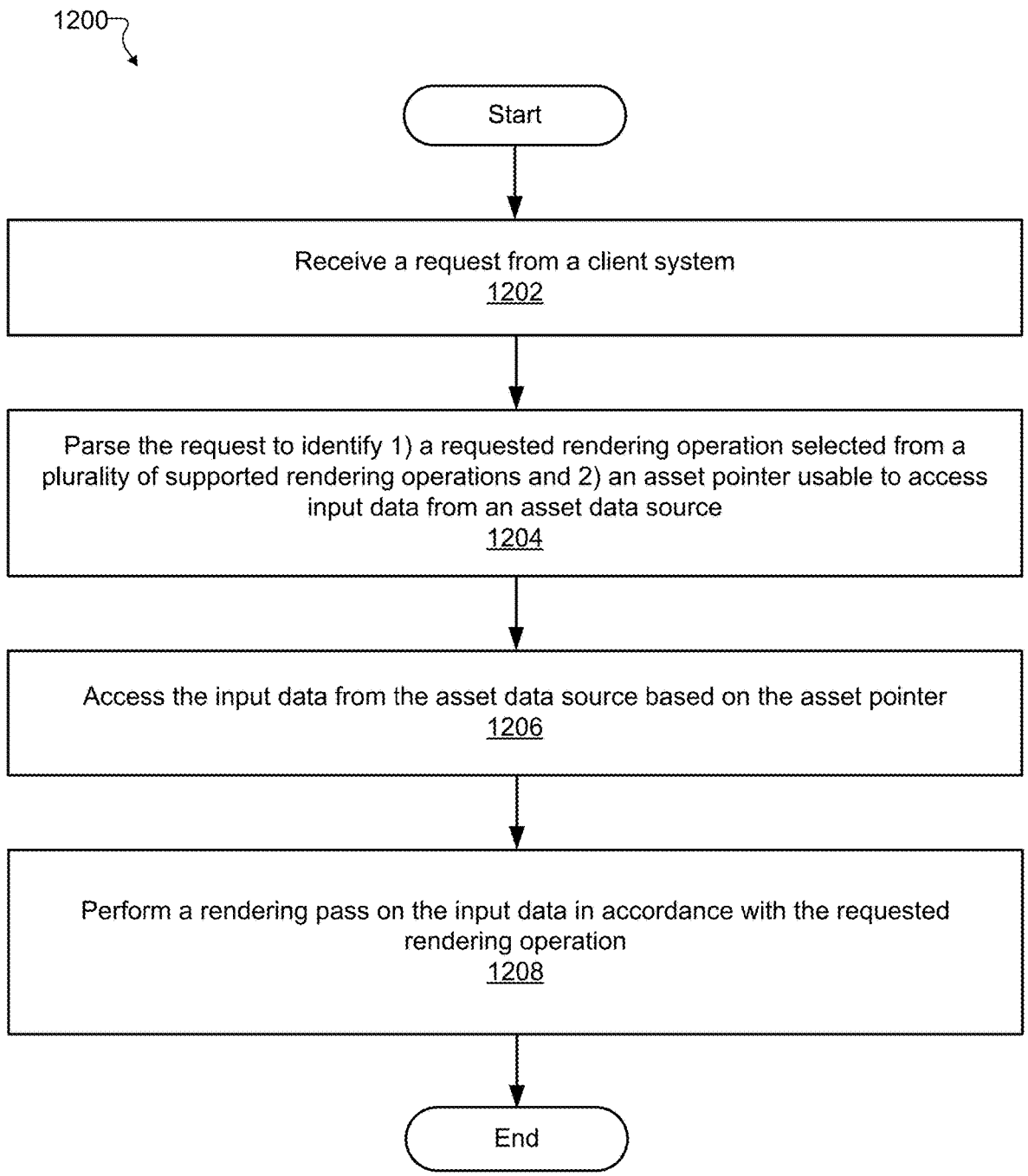
FIGS. 12-13 illustrate exemplary methods for request-based graphics rendering at a MEC server according to embodiments described herein.

FIG. 12 illustrates an exemplary method 1200 for request-based graphics rendering at a MEC server. While FIG. 12 illustrates exemplary operations according to one embodiment, other embodiments may omit, add to, reorder, and/or modify any of the operations shown in FIG. 12. One or more of the operations shown in FIG. 12 may be performed by system 100, any components included therein, and/or any implementation thereof.

In operation 1202, a rendering assistance system implemented by a MEC server may receive a request from a client system. In some examples, the client system may be separate from the MEC server. Operation 1202 may be performed in any of the ways described herein.

In operation 1204, the rendering assistance system may parse the request received in operation 1202. By parsing the request in operation 1204, the rendering assistance system may, in certain examples, identify a requested rendering operation that has been selected from a plurality of rendering operations supported by the rendering assistance system. Additionally, the rendering assistance system may, in the parsing of the request, identify an asset pointer usable by the rendering assistance system to access input data from an asset data source. Operation 1204 may be performed in any of the ways described herein.

In operation 1206, the rendering assistance system may access the input data from the asset data source. For example, the rendering assistance system may access the input data based on the asset pointer identified in the parsing performed for operation 1204. Operation 1206 may be performed in any of the ways described herein.

In operation 1208, the rendering assistance system may perform a rendering pass on the input data accessed in operation 1206. For example, the rendering pass may be performed in accordance with the requested rendering operation identified in the parsing performed for operation 1204. By performing the rendering pass in accordance with the requested rendering operation, operation 1208 may partially render an image that, when fully rendered, is to be presented to a user by way of a media player device. Operation 1208 may be performed in any of the ways described herein.

Figure 13:
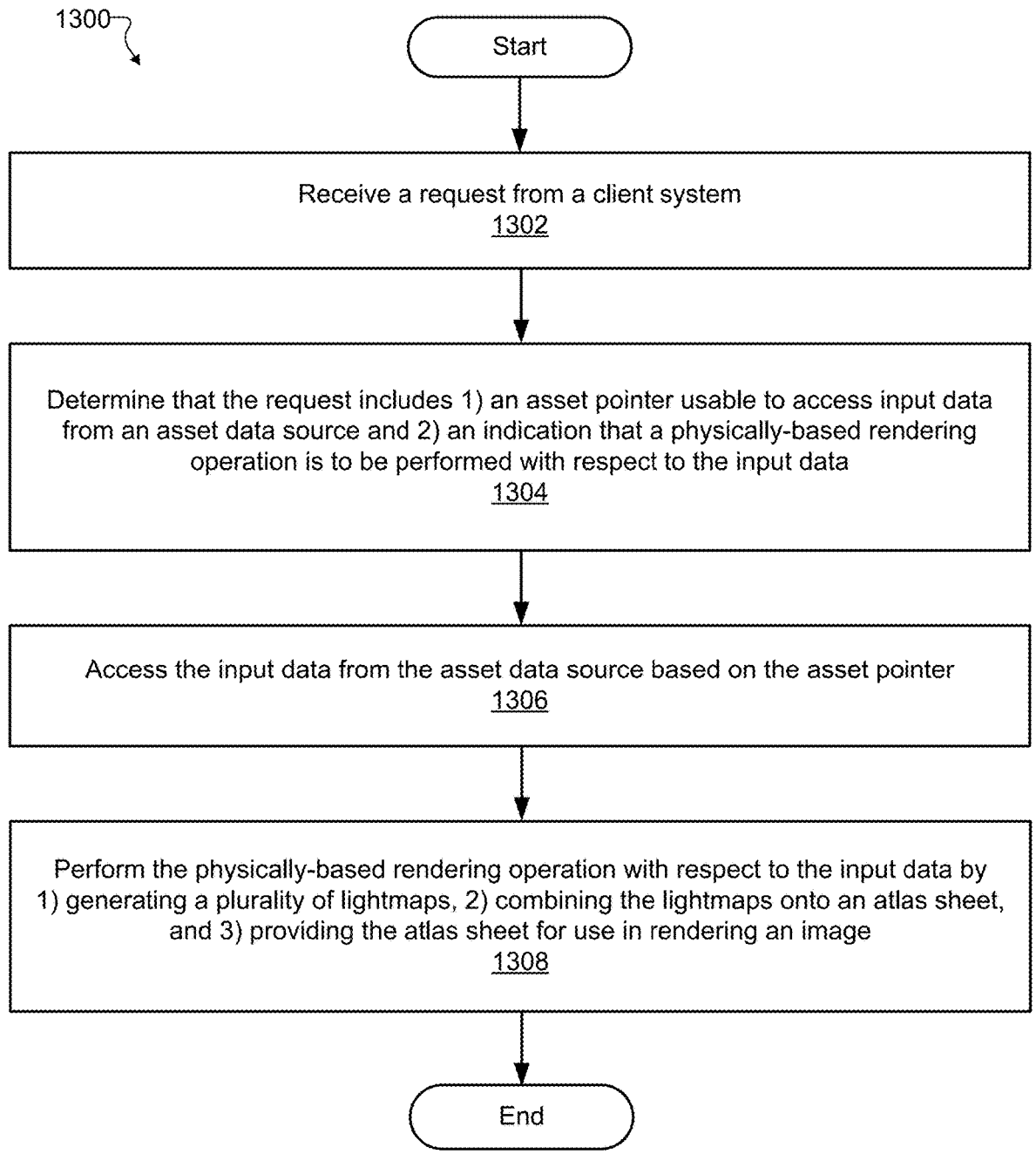

FIG. 13 illustrates another exemplary method 1300 for request-based graphics rendering at a MEC server. While FIG. 13 illustrates exemplary operations according to one embodiment, other embodiments may omit, add to, reorder, and/or modify any of the operations shown in FIG. 13. One or more of the operations shown in FIG. 13 may be performed by system 100, any components included therein, and/or any implementation thereof.

In operation 1302, a rendering assistance system implemented by a MEC server may receive a request from a client system. In certain examples, the client system may be separate from the MEC server. Operation 1302 may be performed in any of the ways described herein.

In operation 1304, the rendering assistance system may determine that the request received in operation 1304 includes an asset pointer usable by the rendering assistance system to access input data from an asset data source. Additionally, the rendering assistance system may determine, in operation 1304, an indication that a physically-based rendering operation is to be performed with respect to the input data. Operation 1304 may be performed in any of the ways described herein.

In operation 1306, the rendering assistance system may access the input data from the asset data source. For example, the rendering assistance system may access the input based on the asset pointer included within the request received in operation 1304. Operation 1306 may be performed in any of the ways described herein.

In operation 1308, the rendering assistance system may perform the physically-based rendering operation determined to be requested in operation 1304 with respect to the input data accessed in operation 1306. For example, the rendering assistance system may perform the physically-based rendering operation in accordance with the request by 1) generating a plurality of octahedral lightmaps based on the input data, 2) combining the plurality of octahedral lightmaps onto an atlas sheet, and 3) providing the atlas sheet for use in rendering an image that is to be presented to a user by way of a media player device. Operation 1308 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
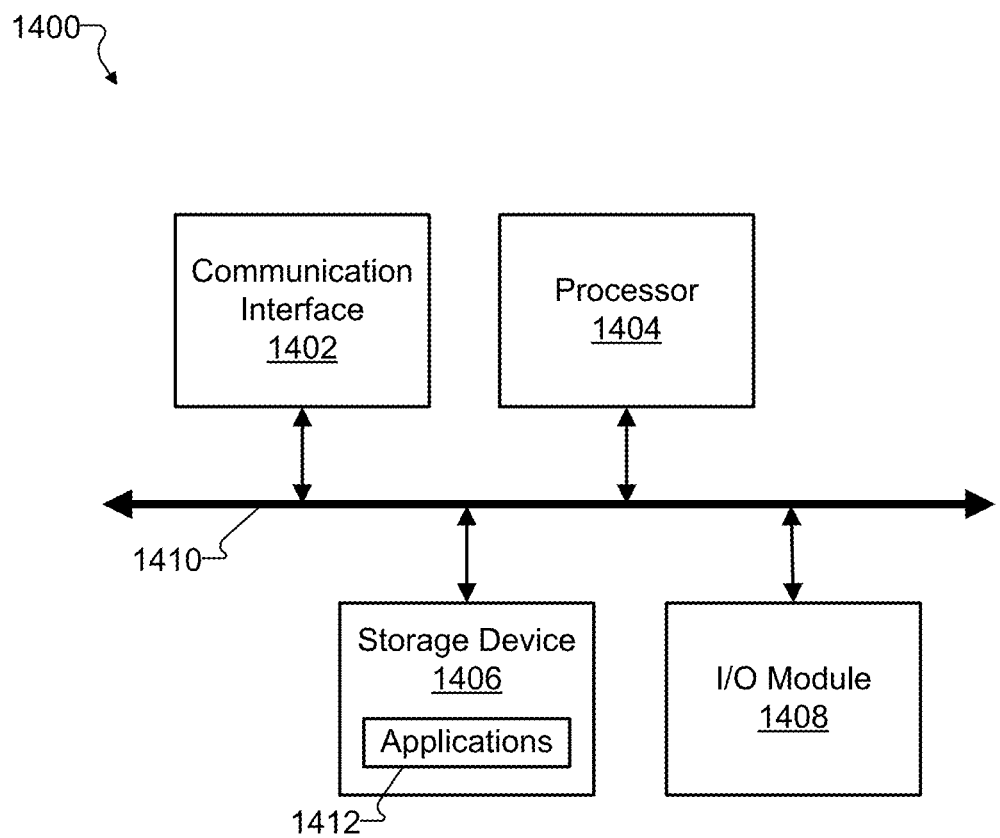
FIG. 14 illustrates an exemplary computing device according to principles described herein.

FIG. 14 illustrates an exemplary computing device 1400 that may be specifically configured to perform one or more of the processes described herein. For example, computing device 1400 may implement a rendering assistance system such as system 100, a device such as media player device 402, a MEC server such as MEC server 406, a state server such as state server 1102, or any other computing devices described herein.

As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with processing facility 104 of system 100. Likewise, storage facility 102 of system 100 may be implemented by or within storage device 1406.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a multi-access server, a request from a client system, the request indicating a requested rendering operation;
   accessing, by the multi-access server, input data from an asset data source; and
   performing, by the multi-access server, a rendering pass on the input data, the rendering pass performed in accordance with the requested rendering operation to generate a render pass output dataset that:
   is representative of a renderable image depicting image content in a first form having limited quality or detail, and
   is configured for use in generating fully-rendered image data that depicts the image content in a second form having additional quality or detail beyond the limited quality or detail of the first form.

2. The method of claim 1, wherein:
   the asset data source is the multi-access server;
   the request further indicates an asset pointer that includes a link to a file location, within the multi-access server, at which the input data is stored; and
   the accessing of the input data is performed based on the asset pointer.

3. The method of claim 1, wherein:
   the asset data source is an external data store separate from and communicatively coupled to the multi-access server;
   the request further indicates an asset pointer that includes a link to a file location, within the external data store, at which the input data is stored; and
   the accessing of the input data is performed based on the asset pointer.

4. The method of claim 1, wherein:
   the request indicates a set of requested rendering operations that includes the requested rendering operation;
   the request further indicates that the set of requested rendering operations are to form a rendering pipeline through which a plurality of frames included in a frame sequence are to be processed;
   the accessing of the input data includes accessing the frame sequence from the asset data source; and
   the rendering pass is performed on the input data by forming the rendering pipeline to perform the set of requested rendering operations and processing, within the rendering pipeline, each of the plurality of frames included in the frame sequence.

5. The method of claim 1, wherein the request further indicates a rendering operation parameter associated with the requested rendering operation, the rendering operation parameter indicative of how the rendering pass is to be performed.

6. The method of claim 1, further comprising providing, by the multi-access server subsequent to the performing of the rendering pass, the render pass output dataset to the client system;
   wherein the client system is separate from the multi-access server and is configured to perform an additional rendering pass on the render pass output dataset to generate the fully-rendered image data for presentation to a user by way of a media player device.

7. The method of claim 1, wherein:
   the request further indicates an additional requested rendering operation distinct from the requested rendering operation; and
   the method further comprises performing, by the multi-access server subsequent to the performing of the rendering pass, an additional rendering pass on the render pass output dataset, the additional rendering pass performed in accordance with the additional requested rendering operation to generate the fully-rendered image data for presentation to a user by way of a media player device.

8. The method of claim 1, wherein:
the client system that provides the request received by the multi-access server is implemented by a media player device separate from the multi-access server; and
the method further comprises providing, by the multi-access server subsequent to the performing of the rendering pass and in response to the request received from the media player device, the render pass output dataset or the fully-rendered image data to the media player device for presentation to a user of the media player device.

9. The method of claim 1, wherein:
the client system that provides the request received by the multi-access server is implemented by a state server that is separate from a media player device and that is configured to provide the request to the multi-access server on behalf of the media player device; and
the method further comprises providing, by the multi-access server subsequent to the performing of the rendering pass and in response to the request received from the state server, the render pass output dataset or the fully-rendered image data to the media player device for presentation to a user of the media player device.

10. The method of claim 1, further comprising parsing, by the multi-access server, the request received from the client system to identify:
the requested rendering operation, and
an asset pointer associated with the asset data source;
wherein the accessing of the input data and the performing of the rendering pass are performed based on the parsing of the request.

11. The method of claim 1, wherein the requested rendering operation indicated in the request is a rendering operation selected from a plurality of rendering operations supported by a rendering assistance system that is implemented by the multi-access server and that performs the rendering pass on the input data.

12. A system comprising:
a memory storing instructions; and
one or more processors communicatively coupled to the memory and configured to execute the instructions to perform a process comprising:
receiving a request from a client system, the request indicating a requested rendering operation;
accessing input data from an asset data source; and
performing a rendering pass on the input data, the rendering pass performed in accordance with the requested rendering operation to generate a render pass output dataset that:
is representative of a renderable image depicting image content in a first form having limited quality or detail, and
is configured for use in generating fully-rendered image data that depicts the image content in a second form having additional quality or detail beyond the limited quality or detail of the first form.

13. The system of claim 12, wherein:
the asset data source is the system comprising the memory and the one or more processors;
the request further indicates an asset pointer that includes a link to a file location, within the memory, at which the input data is stored; and
the accessing of the input data is performed based on the asset pointer.

14. The system of claim 12, wherein:
the asset data source is an external data store separate from and communicatively coupled to the system comprising the memory and the one or more processors;
the request further indicates an asset pointer that includes a link to a file location, within the external data store, at which the input data is stored; and
the accessing of the input data is performed based on the asset pointer.

15. The system of claim 12, wherein:
the request indicates a set of requested rendering operations that includes the requested rendering operation;
the request further indicates that the set of requested rendering operations are to form a rendering pipeline through which a plurality of frames included in a frame sequence are to be processed;
the accessing of the input data includes accessing the frame sequence from the asset data source; and
the rendering pass is performed on the input data by forming the rendering pipeline to perform the set of requested rendering operations and processing, within the rendering pipeline, each of the plurality of frames included in the frame sequence.

16. The system of claim 12, wherein the request further indicates a rendering operation parameter associated with the requested rendering operation, the rendering operation parameter indicative of how the rendering pass is to be performed.

17. The system of claim 12, wherein:
the process further comprises providing, subsequent to the performing of the rendering pass, the render pass output dataset to the client system; and
the client system is separate from the system comprising the memory and the one or more processors and is configured to perform an additional rendering pass on the render pass output dataset to generate the fully-rendered image data for presentation to a user by way of a media player device.

18. The system of claim 12, wherein:
the request further indicates an additional requested rendering operation distinct from the requested rendering operation; and
the process further comprises performing, subsequent to the performing of the rendering pass, an additional rendering pass on the render pass output dataset, the additional rendering pass performed in accordance with the additional requested rendering operation to generate the fully-rendered image data for presentation to a user by way of a media player device.

19. The system of claim 12, wherein the memory and the one or more processors are implemented by a multi-access edge compute ("MEC") server separate from the client system.

20. A non-transitory computer-readable medium storing instructions that, when executed, direct a processor of a computing device to perform a process comprising:
receiving a request from a client system, the request indicating a requested rendering operation;
accessing input data from an asset data source; and
performing a rendering pass on the input data, the rendering pass performed in accordance with the requested rendering operation to generate a render pass output dataset that:
is representative of a renderable image depicting image content in a first form having limited quality or detail, and is configured for use in generating fully-rendered image data that depicts the image content in a second form having additional quality or detail beyond the limited quality or detail of the first form.

* * * * *